United States Patent
Cullom et al.

(10) Patent No.: US 7,314,140 B2
(45) Date of Patent: Jan. 1, 2008

(54) APPARATUS AND METHOD FOR SEPARATING MATERIALS

(75) Inventors: James P. Cullom, Hamilton, MI (US); Gordon J. Van Wylen, Holland, MI (US); William J. Van Bronkhorst, Zeeland, MI (US); Thomas D. Graham, Holland, MI (US)

(73) Assignee: Flo-Cait, Inc., Holland, MI (US)

( * ) Notice: Subject to any disclaimer, the term of this patent is extended or adjusted under 35 U.S.C. 154(b) by 474 days.

(21) Appl. No.: 10/951,238

(22) Filed: Sep. 27, 2004

(65) Prior Publication Data

US 2006/0065585 A1 Mar. 30, 2006

(51) Int. Cl.
*B03B 5/60* (2006.01)
*B03B 5/64* (2006.01)
*B03D 1/00* (2006.01)

(52) U.S. Cl. .............. 209/173; 209/155; 210/221.1; 210/522

(58) Field of Classification Search ............ 209/172, 209/172.5, 173, 17, 155, 162, 208; 210/521, 210/522, 538, 221.1; 241/20, 79.1
See application file for complete search history.

(56) References Cited

U.S. PATENT DOCUMENTS

| | | | | |
|---|---|---|---|---|
| 556,111 A | * | 3/1896 | Talbot | 209/173 |
| 3,568,839 A | * | 3/1971 | Dunlea | 210/194 |
| 4,055,488 A | * | 10/1977 | Siri et al. | 209/173 |
| 4,294,691 A | * | 10/1981 | Patzlaff | 209/3.1 |
| 4,375,264 A | * | 3/1983 | Porter | 209/606 |
| 4,750,995 A | * | 6/1988 | Fogerson | 209/173 |
| 4,813,618 A | | 3/1989 | Cullom | |
| 4,858,769 A | * | 8/1989 | DeVries | 209/3.1 |
| 5,110,454 A | * | 5/1992 | Parker et al. | 209/155 |
| 5,240,114 A | * | 8/1993 | Parker et al. | 209/17 |
| 5,482,165 A | * | 1/1996 | Johnston | 209/244 |
| 5,658,662 A | * | 8/1997 | Leumer | 428/364 |
| 6,962,255 B2 | * | 11/2005 | Tse | 209/685 |
| 7,017,753 B2 | * | 3/2006 | Tse | 209/162 |

* cited by examiner

*Primary Examiner*—Patrick Mackey
*Assistant Examiner*—Mark Hageman
(74) *Attorney, Agent, or Firm*—Warner Norcross & Judd LLP

(57) ABSTRACT

A material separator for separating at least two different materials of differing densities and/or sizes of particles. The material separator generally includes a tank containing a flocculent, a circulation system for circulating flocculent within the tank and a pair of conveyors for moving two different materials out of the tank. The tank may include an upper chamber and a lower chamber. At least a portion of each of the conveyors is located in the upper chamber to catch materials fed into the flocculent. Each of the conveyors may include a mesh belt that permits the flocculent to flow through the conveyor. The tank may include a clean out valve that permits fines and other debris accumulated within the upper chamber to pass into the lower chamber. The flocculent circulation assembly may include a nozzle that can be constructed in various configurations to create flows of flocculent of various velocities and trajectories. In one embodiment, the lower chamber includes a drag line assembly that removes fines and other accumulated debris from the lower chamber.

3 Claims, 22 Drawing Sheets

APPARATUS AND METHOD FOR SEPARATING MATERIALS

BACKGROUND OF THE INVENTION

The present invention relates to an apparatus and method for separating materials for reclamation, disposal and other purposes.

There are a wide variety of industrial applications where mixed materials are generated. For example, demolition debris may include a mix of wood, concrete and various metals. In another example, a variety of industrial manufacturing processes yield waste that includes mixed materials. Further, mixed materials may be result from mining, land clearing or other extraction methods. In many applications, mixed materials simply accumulate as useless waste, and may ultimately need to be moved to a landfill or other waste storage site at significant cost.

Many of these mixed materials include at least one material that, if separated efficiently, would be suitable for reuse, recycling or other reclamation. In some applications all of the mixed materials may be subject to reuse, recycling or other reclamation once sorted, and therefore would not leave significant waste once sorted. Although separation is desirable, the apparatus and methods currently available for separating materials can be labor intensive and costly. In an effort to provide an alternative to manual sorting, an apparatus for sorting demolition debris is shown in U.S. Pat. No. 4,813,518, which issued on Mar. 21, 1989 to one of the inventors of the present invention. Although a marked improvement over preexisting apparatus and methods for sorting demolition debris, the apparatus of the '518 patent is not ideal for all potential sorting applications. For example, the apparatus is relatively large and not easily moved from location-to-location. Further, the apparatus is primarily intended for use in sorting demolition debris and is therefore tailored specifically for that application. The apparatus is not designed with the adjustability to permit a single machine to be readily tuned for use in other applications. Also, fines and other solids accumulate in the tank, thereby requiring periodic cleaning of the tank. Despite the benefits of the apparatus of the '518 patent, various industries could benefit from a highly effective separator with increased efficiency and improved performance. Further, an apparatus that is more easily adapted for use in different applications would be beneficial.

SUMMARY OF THE INVENTION

The aforementioned problems are overcome by the present invention wherein a material separator is provided with a tank-over-tank design. The tank includes an internal divider that separates the tank into upper and lower chambers. In one embodiment, the internal divider includes a valve that controls the flow of flocculent from the upper chamber to the lower chamber. The valve may be a butterfly valve that can be pivoted to permit more or less flocculent to flow from the upper chamber into the lower chamber.

In one embodiment, the material separator includes a first material conveyor having a mesh belt. The mesh belt permits the flocculent to flow and drain through the belt as the carried materials. The material separator may include a second material conveyor having a mesh belt. The material separator may be provided with additional conveyors in applications where more than two materials are to be separated. If additional conveyors are included, the additional conveyors may also include mesh belt. If desired, the mesh conveyors may include an air knife that expels a strong flow of air through the belt to clean off any fines or other small debris that may be trapped in the mesh belt.

In another embodiment, the material separator includes a clean out valve disposed in the internal divider to permit waste material that has fallen below the conveyors to be flushed into the lower chamber. In this embodiment, the internal divider may be angled and the clean out valve may be disposed at the lowermost end of the internal divider where fines and other solids are most likely to accumulate.

In yet another embodiment, the material separator includes a drag line disposed within the lower chamber. The drag line includes a plurality of wipers that are dragged across the floor of the lower chamber to remove fines and other solids that have accumulated in the lower chamber. The drag line dumps the solids from the tank through an opening in the lower chamber.

In another embodiment, the material separator includes a flocculent circulation system having a nozzle that expels a broad and uniform discharge of flocculent across the upper chamber. The nozzle expels flocculent into a skirt arrangement that causes essentially all of the flocculent to flow onto the belts (and not around the sides of) of the conveyors.

The material separator of one embodiment includes retractable wheels that facilitate movement of the material separator from one location to another. The wheels may be pivotally mounted to the tank and operated by conventional pneumatics. For example, each wheel may include a separate air bag that can be inflated to extend the wheels for movement of the tank and deflated to retract the wheels.

The present invention provides a highly efficient material separator that provides improved material separation for a wide variety of materials. In applications which include a tank-over-tank design, the circulation of flocculent can be carefully controlled to, among other things, facilitate improved separation. In applications which include one or more mesh conveyor belts, the mesh facilitates separation by permitting flocculent to easily pass through the belts. In applications which include an air knife, the life of the mesh belts can be dramatically improved. The accumulation of fines and other debris can have a dramatic impact on the performance of the system and on the life of the components. The clean out valve permits accumulated material to be expelled from upper chamber into the lower chamber. The drag line permits fines, debris and other solids to be expelled from the lower chamber, thereby eliminating the need to manually clean the lower chamber. The nozzle and skirt arrangement improve the performance of the material separator by directing an even and uniform flow of flocculent onto the conveyors. The retractable wheels permit the tank to be easily moved, as desired.

These and other objects, advantages, and features of the invention will be readily understood and appreciated by reference to the detailed description of the preferred embodiment and the drawings.

DETAILED DESCRIPTION OF THE PREFERRED EMBODIMENT

I. Overview

Figure 1:
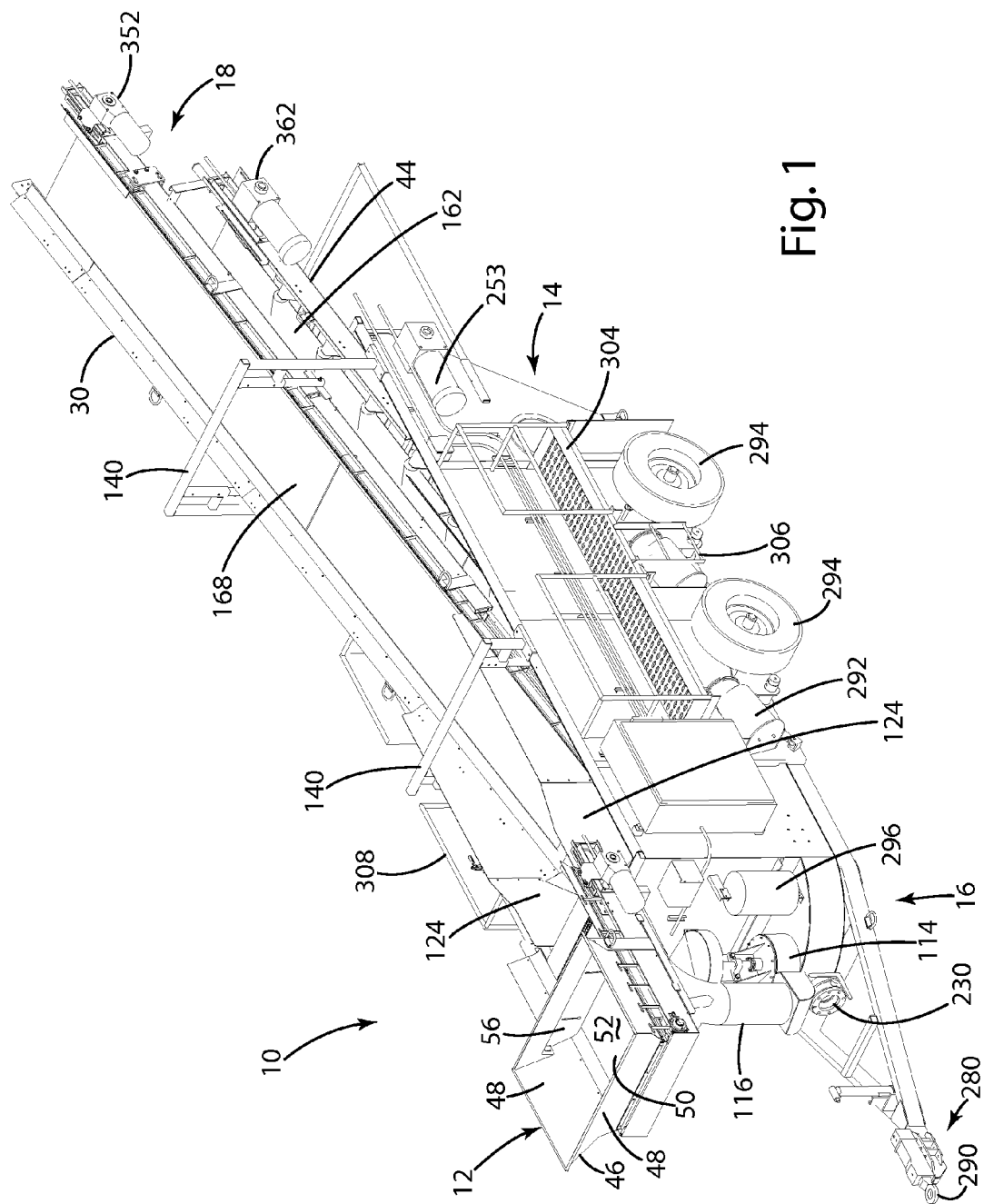
FIG. 1 is a perspective view of a material separator in accordance with an embodiment of the present invention.

A material separator 10 in accordance with the present invention is shown in FIG. 1 and generally designed 10. The material separator 10 generally includes a feed assembly 12 for feeding a mixture of materials into the separator 10, a flotation tank 14 containing a flocculent 26, a flocculent circulation assembly 16 for circulating the flocculent within the tank 14, and two or more material conveyors 18 for moving the separated materials from the tank 14 (See also FIG. 5a). In operation, the material separator 10 functions to separate the different materials in the mixture of materials through the use of a circulating flocculent 26 and spaced apart material conveyors 18. Separation is initiated when material 24 to be separated is deposited into the feed assembly 12. The feed assembly 12 gradually distributes the material 24 to be separated into the flocculent 26 contained within the flotation tank 14. Although numerous complex factors contribute the separation of the materials, the materials that have the lower specific gravity (material A) are moved by the circulating flocculent onto the first conveyor 30. The first conveyor 30 carries material A over the far wall 36 of the flotation tank 14 where material A is then deposited into a suitable collection container or another collection means. The material with a greater specific gravity (material B), descends to the bottom of the upper chamber 42 of the flotation tank 14 and onto the second conveyor 44. The second conveyor 44, which is located below the first conveyor 30, carries material B over the far wall 36 of the flotation tank 14 where material B is then deposited into a suitable collection container or another collection means separate from material A.

The present invention is described in connection with illustrations showing a single embodiment of the present invention. The present invention is well suited for use in separating a wide variety of materials, including demolition debris, and can be adapted to correspond with the density/specific gravity/particle size of the materials to be sorted. In general, the present invention operates on the principle that materials of greater density, greater specific gravity or greater particle size will drop more quickly than materials entering the tank of lower density, lower specific gravity or smaller particle size within the flocculent. As described in more detail below, the present invention includes a variety of features that facilitate its tuning for use in discrete applications with various materials to be separated. For example, by varying the characteristics of the flocculent (e.g. density, specific gravity, viscosity and temperature), the speed at which the flocculent is circulated within the system, the angle at which the flocculent is expelled from the nozzle, the speed at which the materials to be separated are introduced into the flotation tank, the characteristics of the material conveyor belts (e.g. openness of the of the mesh), the speed of the material conveyor belts, the distribution of the material to be separated as it enters the flotation tank and the rate at which the flocculent flows from the upper chamber to the lower chamber, the material separator can be tuned to separate a wide variety of materials. The present invention is described in connection with an embodiment for separating two materials. The present invention is also suitable for use in separating three or more materials provided that the materials are sufficiently dissimilar in density, specific gravity and/or particle size.

II. Feed Assembly

Figure 19:
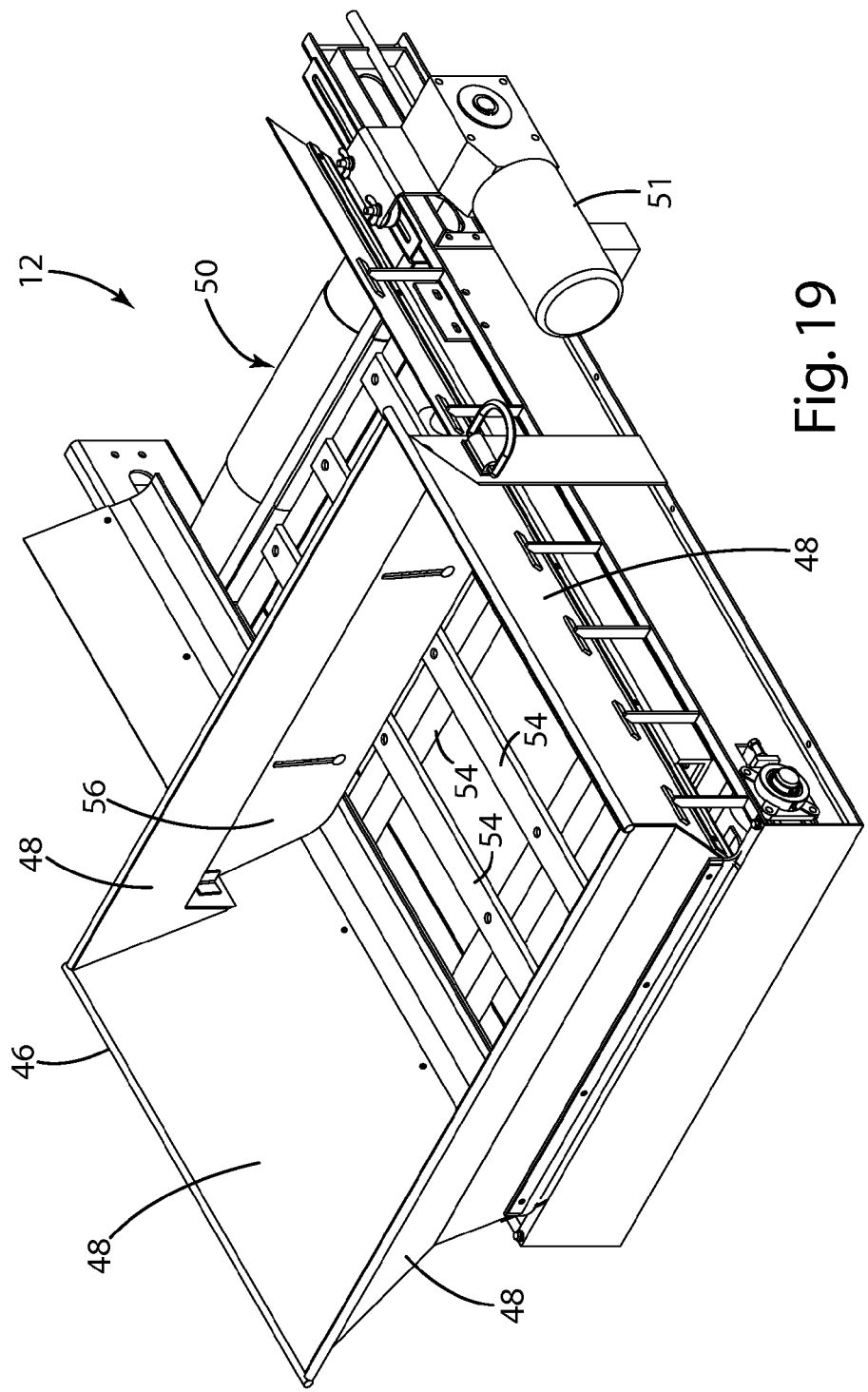
FIG. 19 is a perspective view of the feed assembly with the feed assembly conveyor belt removed.

As noted above, the feed assembly 12 moves the materials to be separated into the tank 14. The materials may be pre-screened as necessary to remove unwanted materials, such as excessively large items or particles of sand and dirt. A variety of pre-screening apparatus, such as vibratory screens, are known and therefore will not be described herein. As perhaps best shown in FIGS. 1 and 19, the feed assembly generally includes a hopper 46 for receiving the materials to be sorted, conveyor 50 for moving the materials into the tank 14 and a weighted flipper 56 for limiting and distributing the materials evenly over the conveyor 50. The separation process begins when material 24 to be separated is deposited into the feed assembly hopper 46. The feed assembly hopper 46 has four, funneled side walls 48 that channel material onto the feed assembly conveyor 50. The feed assembly conveyor 50 is a generally conventional adjustable-speed conveyor that has a belt 52 made of rubber or any other suitable material and an adjustable speed drive motor 51. In the depicted embodiment, the feed assembly conveyor belt 52 is supported by a framework of longitudinal and transverse support members 54, but the belt 52 could also be supported by rollers or any other suitable means.

Material 24 to be separated is limited and distributed evenly over the feed assembly conveyor 50 as the material 24 to be separated passes out of the hopper 46 by the operation of a hinged, weighted flipper 56. This flipper 56 is mounted in an opening 58 of the front wall 60 of the hopper 46 above the feed assembly conveyor 50. When material 24 is deposited into the hopper 46 and onto the feed assembly conveyor 50, the conveyor 50 moves the material 24 to be separated against the hinged, weighted flipper 56. The motion of the feed assembly conveyor 50 causes the material 24 to be separated within the hopper 46 to generate a force against the hinged flipper 56. This force causes the flipper 56 to swing out in the direction of the flotation tank 14. The weight of the flipper 56 limits the amount of material that moves beneath and causes the material to be spread out over the conveyor 50. Once past the flipper 56, the feed assembly conveyor 50 then carries the material 24 to be separated over the near wall 62 of the flotation tank 14 and drops the material 24 to be separated into the flocculent 26 at the near end of the flotation tank 14 (See FIG. 5a).

Figure 4:
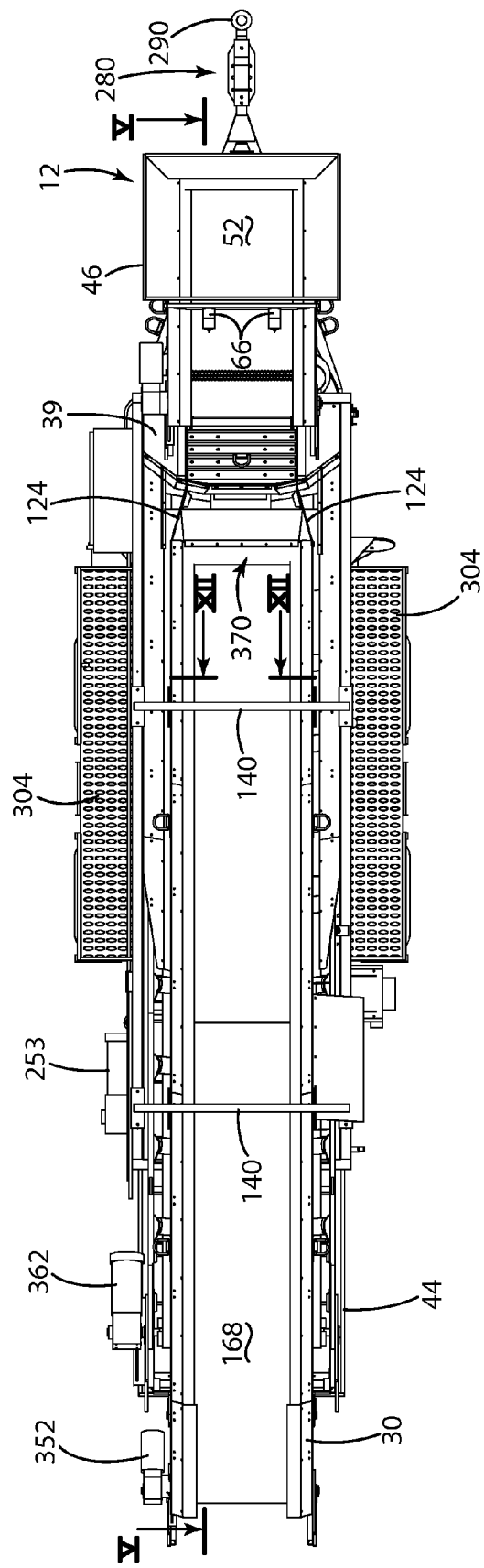
FIG. 4 is a top plan view of the material separator.

The rate at which the material 24 is deposited into the flotation tank 14 from the feed assembly 12 will affect the separation characteristics of the material separator 10, and the rate may be tuned to enhance the performance of the system. This rate can be controlled in many ways. For example, the rate at which the feed assembly conveyor belt 52 travels can be adjusted. In this embodiment, the conveyor belt 52 is driven by a variable-speed electric motor 51. The rate of belt 52 can be easily adjusted by varying the speed of the motor 51. Also, the weight 66 (See FIG. 4) placed on the flipper 56 can be increased or decreased to control the amount and distribution of material 24 on the feed assembly conveyor 50 passing out of the hopper 46. The height of the feed assembly conveyor 50 above the flotation tank 14 can also be adjusted to control the performance of the separation system 10. The higher the height of the conveyor 50 over the flotation tank 14, the greater the speed the material 24 has as the material 24 enters the flow 32 of flocculent 26 released from the nozzle 34, which is described in more detail below. This speed has an effect on the accuracy and overall performance of the separation system 10.

Although the feed assembly 12 is expected to be desirable in most applications, it may be possible to eliminate the feed assembly 12 in some applications. In such applications, the materials to be separated are introduced into the tank 14 by other mechanisms. For example, the materials may be dumped directly into the tank 14 by a bucket loader or other machinery or may be moved into the tank 14 by an external conveyor.

III. Flotation Tank

As summarized above, separation of the materials occurs in the flotation tank 14, which contains a circulating flow of flocculent 26. In one embodiment, the flotation tank 14 is a quadrangular shaped open top container. As perhaps best shown in FIGS. 5a and 5b, the depicted embodiment generally includes a flat bottom 68, a near end wall 62, a left side wall 70, a right side wall 72 and far end wall 36. The far end tank wall 36 is sloped away from the near end (e.g. end toward the feed assembly) of the flotation tank 14. In one embodiment, the tank 14 includes a drag line assembly 76, which is described in more detail below (See FIG. 16). In this embodiment, the far end wall 36 of the flotation tank 14 defines a drag line outlet 74 through which the drag line assembly 76 expels fines and other debris dredged from the tank 14 (See FIG. 5b). In the illustrated embodiment, the drag line outlet 74 is a slot spanning the width of the far end tank wall 36.

In one embodiment, a partition 78 divides the flotation tank 14 into an upper chamber 42 and a lower chamber 88. The partition 78 functions, among other things, to facilitate flocculent 26 circulation as well as aid in maintaining a clean tank 14 to prevent premature component wear. The partition 78 slopes upward from the near end of the flotation tank 14 toward the far end of the flotation tank 14. At the near end of the tank 14, a cleanout valve 82 is installed in the partition 78 (See FIGS. 13a and 13b). This valve 82 (described below) can be opened to allow debris that has collected at the bottom 84 of the second conveyor 44 in the upper chamber 42 to be released into the lower chamber 88 of the flotation tank 14 preventing wear or damage to the second conveyor 44 caused by debris build up. A butterfly valve 86 is also installed in the partition 78 approximately two thirds of the distance back from the near end of the flotation tank 14 (See FIG. 7). The drag line outlet 74 is located in the lower chamber 88 of the flotation tank 14 where the drag line 76 operates.

IV. Flocculent Circulation Assembly

Figure 5A:
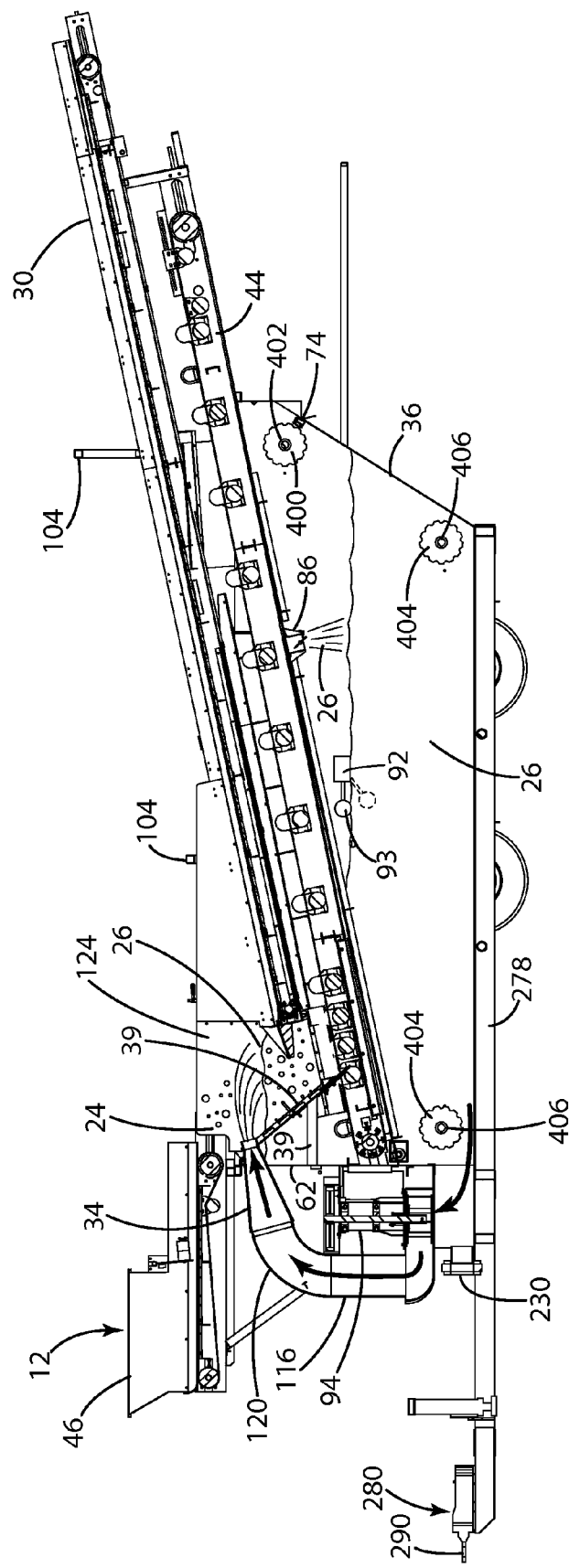
FIG. 5*a* is a sectional view of the material separator taken along line V-V of FIG. 4.

A flocculent 26 is circulated through the tank 14 to facilitate separation of the mixed materials (See FIG. 5a). The flocculent 26 also aids in cleaning the tank 14 and material conveyors 18. In the illustrated embodiment, the material separator 10 includes a flocculent circulation assembly 16 that draws flocculent 26 from the lower chamber 88 and expels it into the upper chamber 42 (See FIGS. 3, 5a and 5b). The flocculent 26 may be any fluid material having the desired specific gravity and other flow characteristics. For example, the flocculent 26 may be selected to have a specific gravity that is greater than the specific gravity of the one of the materials to be sorted and less than that of another of the materials to be sorted. In many applications, water may be used as the flocculent 26 if its specific gravity provides adequate separation performance. If desired, one or more additives may be introduced into the water (or other flocculent) to provide it with the desired characteristics. For example, a surfactant or other agent affecting surface tension can be added to the flocculent. The flocculent 26 is supplied to the material separator 10 by actuating a flocculent supply valve. For example, the circulation system 16 may include a float valve 92 in the lower chamber 88 of the flotation tank 14 to control the flow of additional flocculent 26 into the tank 14. In one embodiment, this float valve 92 includes a conventional supply control valve that is mechanically actuated by a float 93 located in the lower chamber-similar to the float valves used in a standard household toilet. The float valve 92 may be mounted within a water inlet 91 in the side wall 70 of the tank 14 (See FIG. 5b). Essentially any float valve with the desired functionality may be substituted for the described float valve. For example, the float valve may alternatively be electromechanical having a float that provides an electrical signal to the control valve when additional flocculent is needed. The flocculent supply valve need not be a float valve and may alternatively be any of a variety of other types of valves. For example, the valve may be manually turned on by an operator when it is determined that additional flocculent 26 is required.

Figure 20:
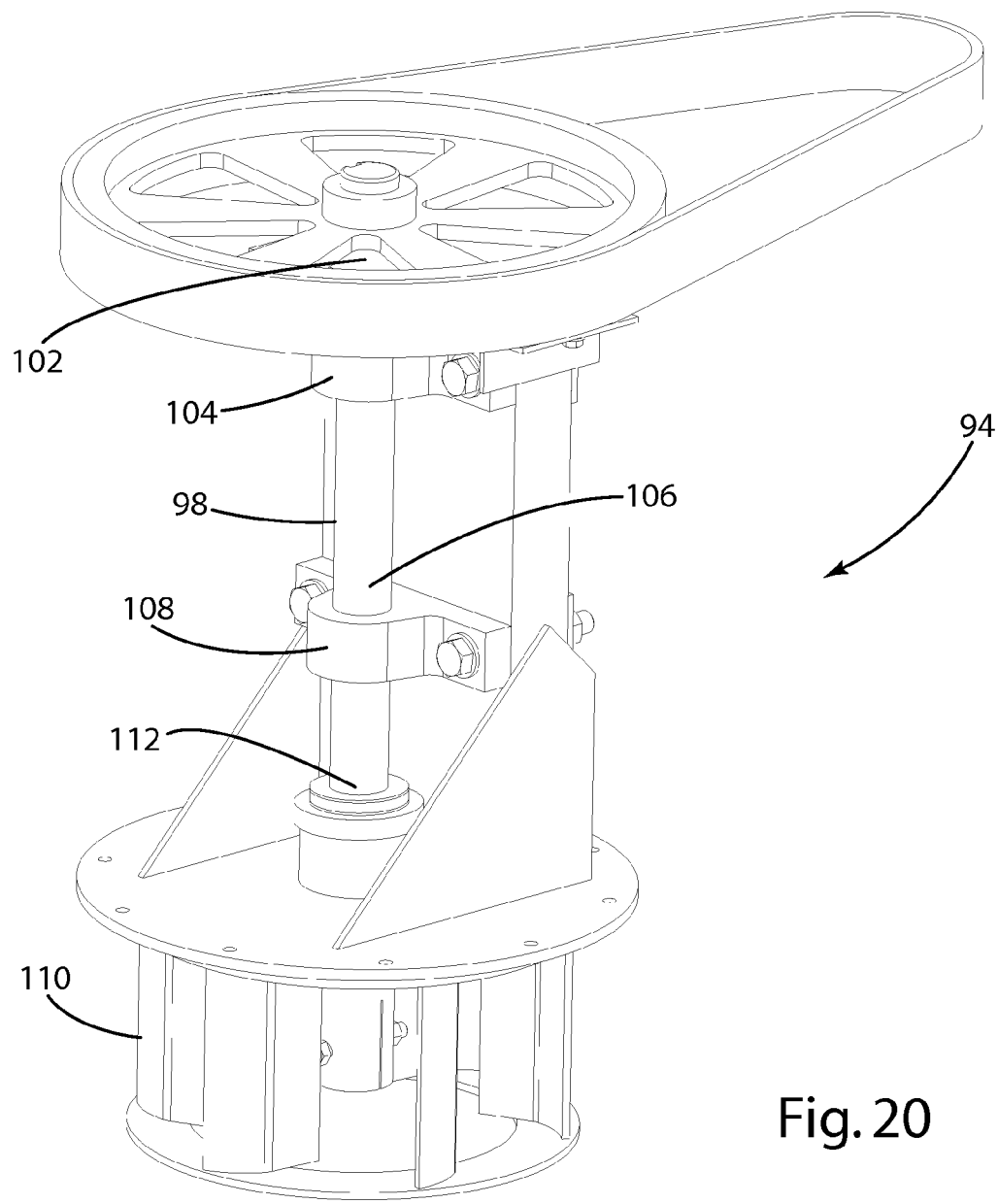
FIG. 20 is a perspective view of the impeller assembly.

Circulation of the flocculent 26 within the flotation tank 14 is driven by an impeller assembly 94 located in front 96 of the near end 64 of the flotation tank 14. Referring now to FIG. 20, the impeller assembly 94 generally includes an impeller blade assembly 110 that is mounted to a shaft 98 and that is driven by a variable speed motor 100. In one embodiment, the shaft 98 is supported at its uppermost end 102 by a bearing 104 and in its mid section 106 by another bearing 108. The impeller blade assembly 110 is located at the bottom 112 of the shaft 98 submerged in the flocculent 26 within the pump housing weldment 114. The number and location of the bearings may, however, vary. For example, in another embodiment, the second bearing 108 is located beneath the impeller blade assembly 110 at the bottom 112 of the shaft 98. In this alternative embodiment, the second bearing 108 is located inside the pump housing weldment 114 submerged in the flocculent 26. Accordingly, it may be desired for the second bearing 108 to be a marine bearing. The formerly described embodiment of the impeller assembly 94 potentially provides advantages in component life over the latter embodiment because the second bearing 108 is not submerged in flocculent 26.

The impeller assembly 94 drives the flocculent 26 up a pipe assembly 116 located in front 118 of the impeller assembly 94 and connected to the pump housing weldment 114. The pipe assembly 116 travels vertically upward from the front 118 of the pump housing weldment 114 and then makes an angle 120 into the top 122 of the near end wall 62 of the flotation tank 14. In the depicted embodiment, this angle 120 is approximately 75 degrees, but the angle 120 may be altered to optimize separation performance of the system 10.

Figure 5B:
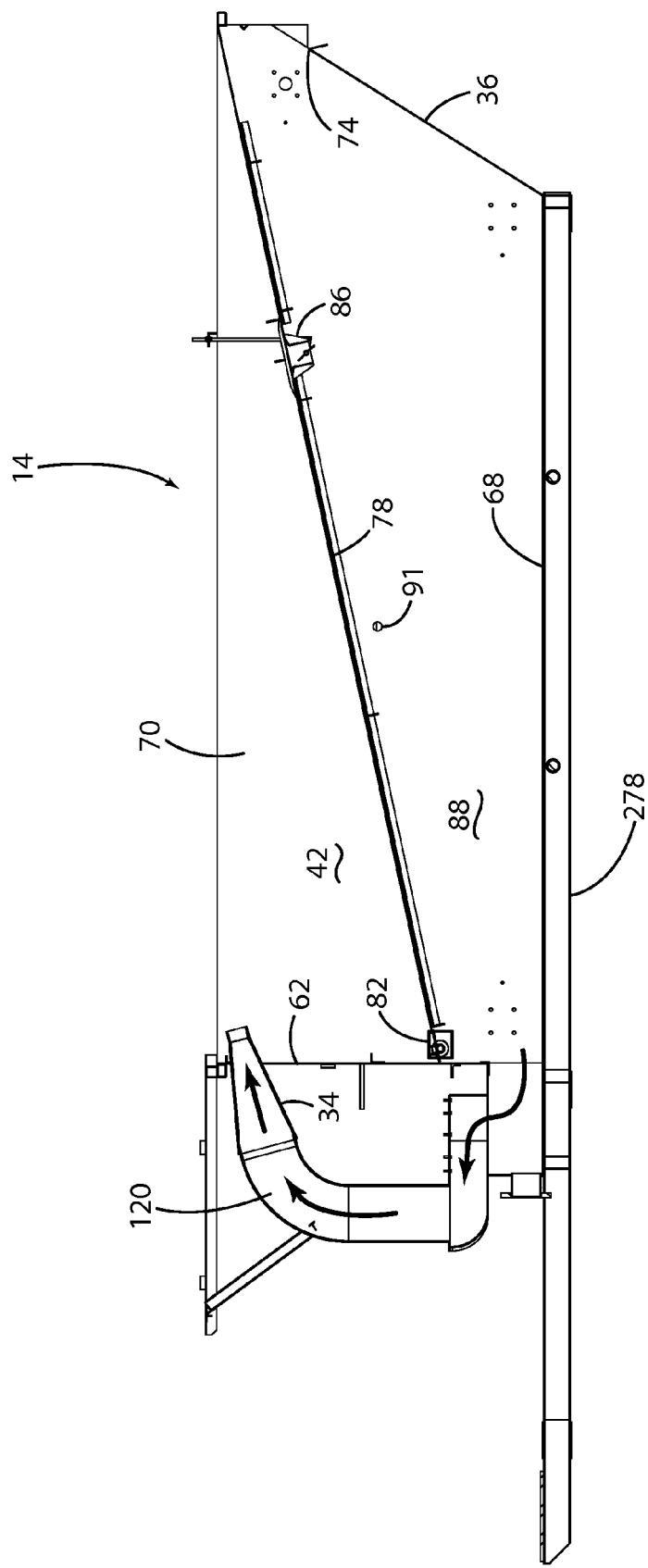
FIG. 5b is a sectional view of the material separator taken along line V-V of FIG. 4 with portions removed to more clearly show the flotation tank.
Figure 9:
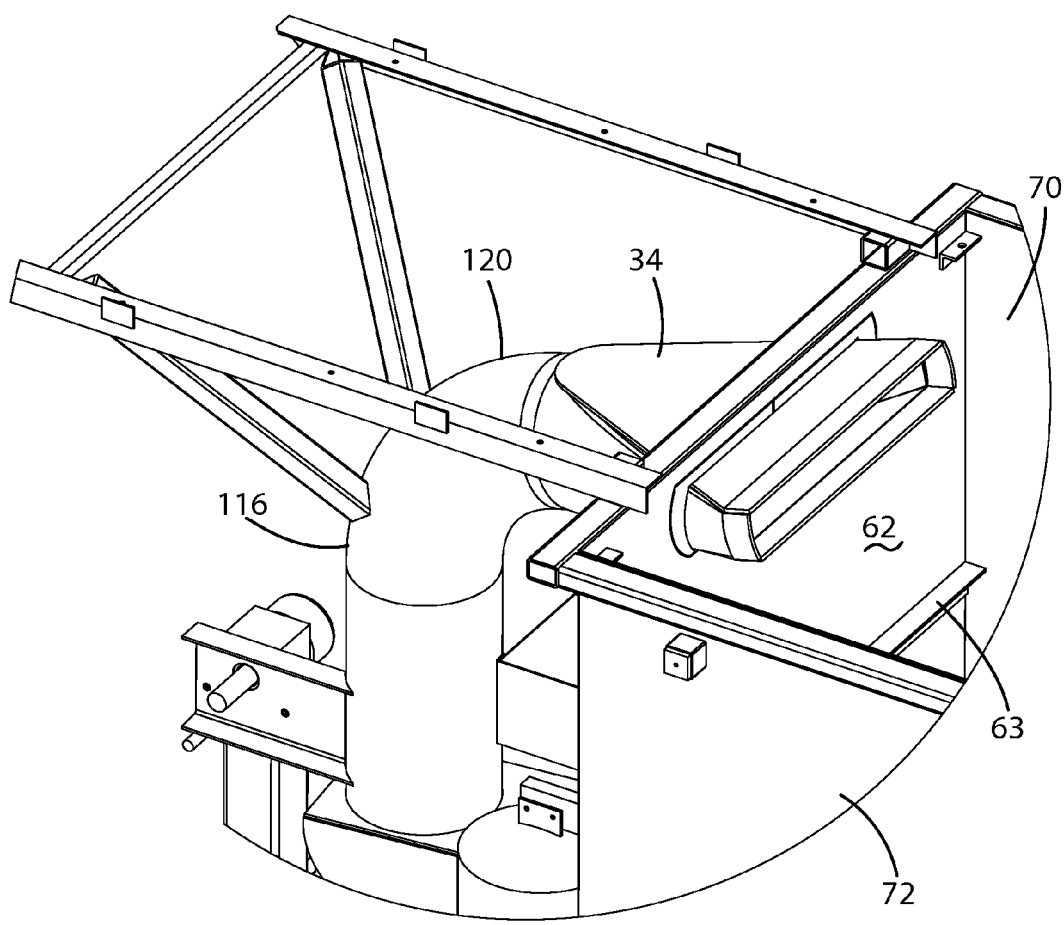
FIG. 9 is a perspective view of a portion of the material separator with portions removed to show the nozzle.

A nozzle 34 is attached to the pipe assembly inlet 122 on the near wall 62 of the flotation tank 14 where the pipe assembly 116 connects to the flotation tank 14 (See FIGS. 5b and 9). One embodiment of this nozzle 34 is an elongated ellipse that causes a flow 32 of flocculent 26 to be directed across the width of the flotation tank 14. In another embodiment, the nozzle 34 size and shape may be altered to produce a flow 32 of flocculent 26 with the desired thickness and speed for the particular separation application. Skirt walls 124 start on both sides of the nozzle 34 and continue up to connect with the sides 126 of the first conveyor 30 (See FIGS. 1 and 10). These skirt walls 124 direct the primary flow 32 of flocculent 26 and guide material A up and onto the first conveyor 30. The skirt walls 124 also extend down from the nozzle 34 to join the edges of the diverter plate 39 (described in more detail below) and extend to the end of the second conveyor 44 to guide heavier material onto the second conveyor 44. In this embodiment, the skirt walls 124 and diverter plate 39 are removably mounted within the tank 14 so that they can be replaced as they become worn or otherwise damaged.

Figure 7:
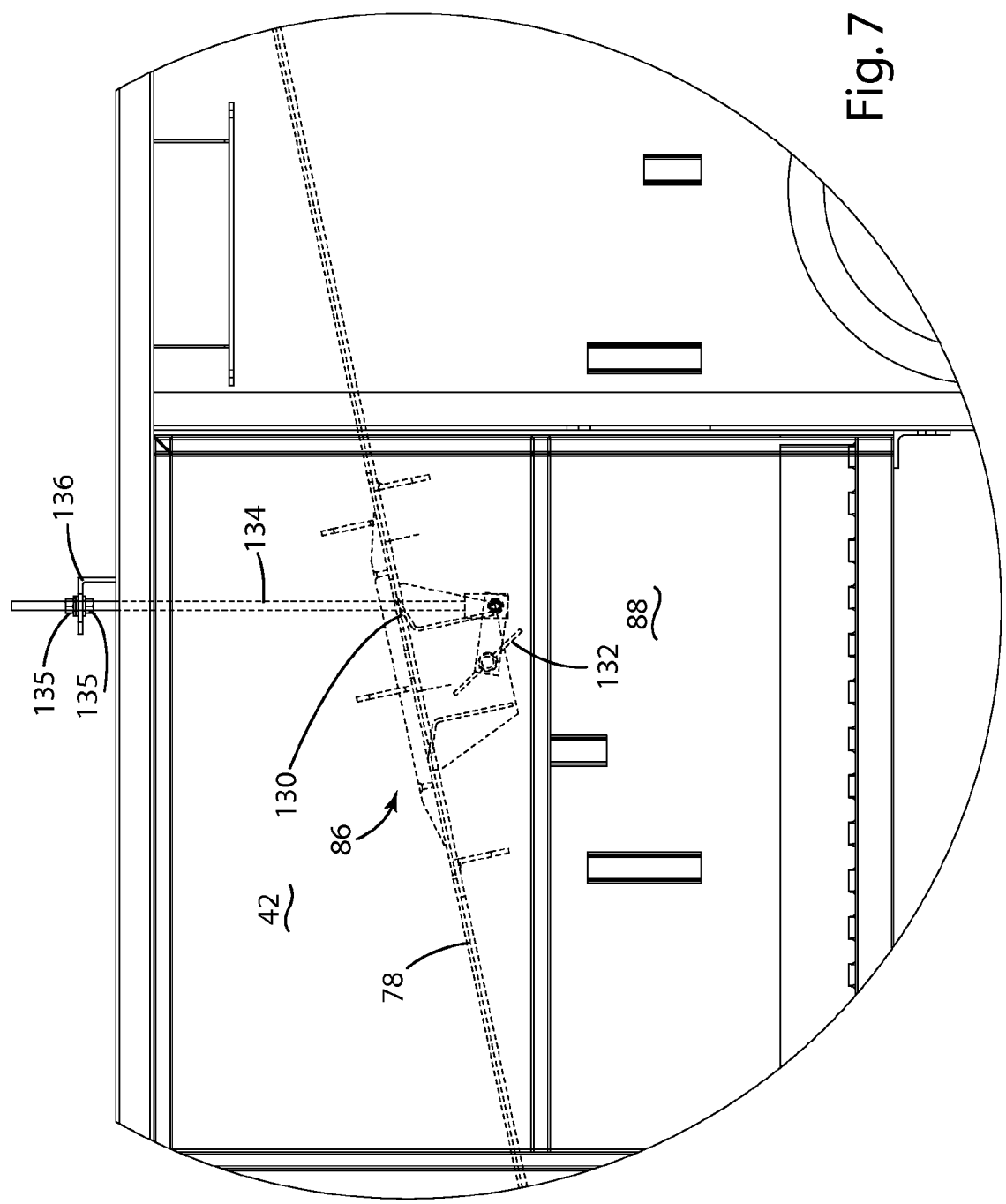
FIG. 7 is an enlarged section view of area VII of FIG. 3 with portions removed to show the butterfly valve.

As noted above, the illustrated embodiment includes a butterfly valve 86 located in the partition 78 of the flotation tank 14 about two thirds of the way back from the near end 64 of the flotation tank 14 (See FIGS. 5a, 5b and 7). The butterfly valve 86 controls the flow of flocculent 26 from the upper chamber 42 to the lower chamber 88 of the flotation tank 14. Adjusting the butterfly valve 86 will affect how much flocculent 26 is reserved in the upper tank 42. The butterfly valve 86 may include manual or automated controls. In operation, the flow 128 of flocculent 26 through the butterfly valve 86 is balanced with the flow 32 of flocculent 26 through the nozzle 34 generated by the impeller assembly 94 to maintain the desired level of flocculent 26 in the upper chamber 42 of the tank 14. The butterfly valve 86 is installed in a slot 130 defined by the partition 78. In this embodiment, the slot 130 substantially spans the width of the flotation tank. A flat, rectangular plate 132 fills this slot 130 when the butterfly valve 86 is completely closed. The rectangular plate 132 is attached to a threaded rod 134 by a conventional linkage. The threaded rod 134 passes through a mounting bracket 136 located on the outside of the flotation tank 14. When the rod 134 is moved, the linkage causes the plate 132 to pivot open or closed allowing more or less flocculent 26 to flow 128 from the upper chamber 42 of the flotation tank 14 to the lower chamber 88. The more the plate 132 of the butterfly valve 86 pivots open, the more flocculent 26 will flow from the upper chamber 42 to the lower chamber 88. A pair of nuts 135 are fitted over the rod 13 on opposite sides of the bracket 136. The nuts 135 can be tightened against the bracket 136 to secure the rod (and hence the butterfly valve 86) in the desired position. The butterfly valve 86 may be adjusted while the separation system 10 is operating to provide the desired balance for optimal performance of the system 10.

V. Material Conveyors

Figure 2:
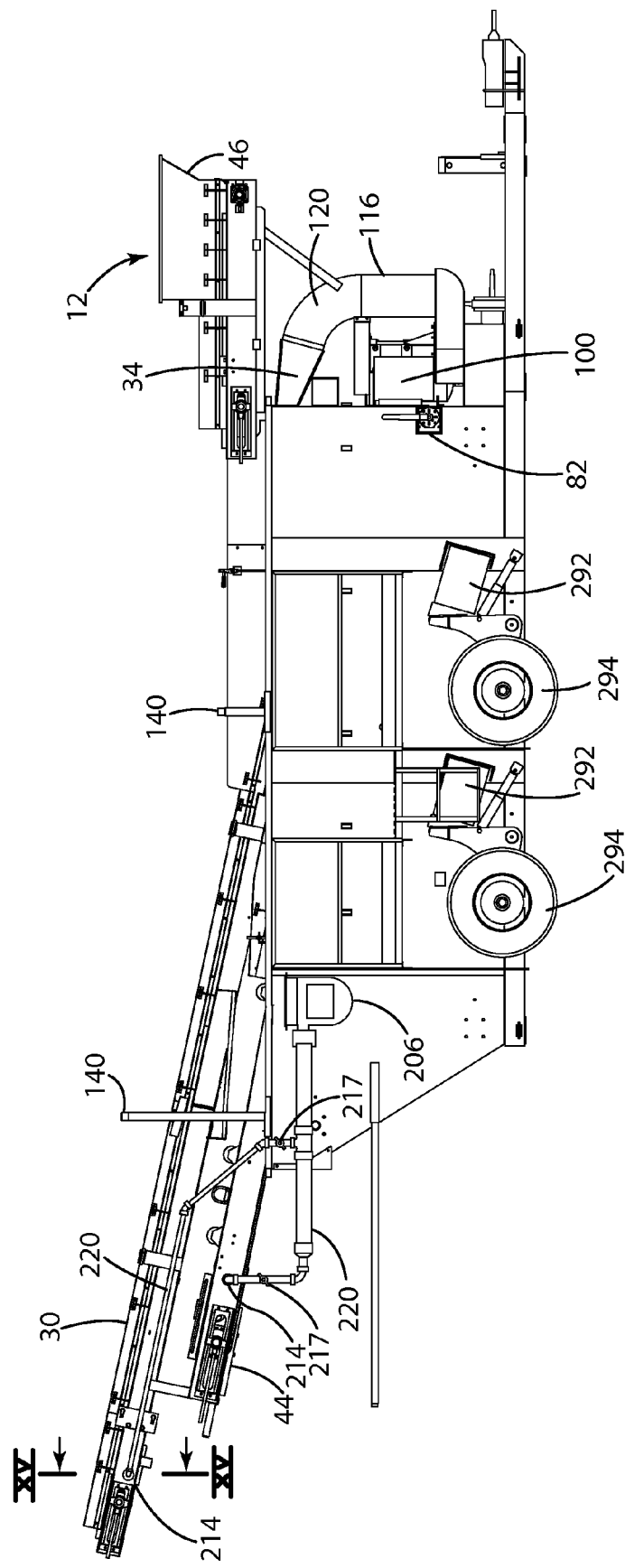
FIG. 2 is a right side elevational view of the material separator.

In the illustrated embodiment, the material separator 10 includes two material conveyors 18 that convey the separated materials from the tank 14 (See FIGS. 1, 2 and 5a). In one embodiment, the separator 10 includes a first conveyor 30 spaced vertically above a second conveyor 44. Both conveyors 18 are located in the upper chamber 42 of the flotation tank 14 and begin at near end 64 of the flotation tank 14 and extend over the far wall 36 of the flotation tank 14. The first conveyor 30 is suspended above the second conveyor 44 using suspension brackets 140. The first conveyor 30 and second conveyor 44 are staggered with the first conveyor 30 starting farther back from the near wall 62 of the flotation tank 14. This permits materials that drop through the flocculent 26 quicker to fall onto the second conveyor 44. The first conveyor 30 also extends farther beyond the flotation tank 14 than the second conveyor 44 so that material A is moved to a different location than material B.

In operation, the first conveyor 30 of this embodiment collects material A that has a lower specific gravity than material B or that is otherwise carried by the flocculent 26 to the first conveyor 30. Material A floats or sinks relatively slowly after being dumped into the flocculent 26 by the feed assembly conveyor 50. The flow 32 of flocculent 26 from the nozzle 34 guides the material A onto the first conveyor 30. The first conveyor 30 carries the material A over the far wall 36 of the flotation tank and deposits material A into a container or another suitable collection means. In this embodiment, the second conveyor 44 collects material B, which has a greater specific density than material A or otherwise falls to the second conveyor. When material B is dropped from the feed assembly conveyor 50 into the flotation tank 14, the material B is not carried as far by the flocculent 26, but instead sinks to the bottom 40 of the upper chamber 42 quickly enough to avoid the first conveyor 30. Material B lands on the second conveyor 44 and is carried over the far wall 36 of the flotation tank 14 where the material B is deposited into a container or some other appropriate collection means. As perhaps best shown in FIGS. 5a and 8, a diverter plate 39 is mounted at bottom of the near end 40 of the flotation tank 14 at an angle in front of the second conveyor 44 to guide the material B onto the second conveyor 44. The diverter plate 39 defines an opening 61 through which extends the nozzle 34. Because the diverter plate 39 is mounted at an angle, it may include supports 59 that extend substantially horizontally from the diverter plate 39 to engage end wall 62 (See FIG. 5a). The supports 59 may engage a bracket 63 mounted on the inside of end wall 62 (See FIG. 9). At least one buffer flight 45 may be installed on the diverter plate 39 to decelerate material B before the material impacts the second conveyor 44 preventing premature wear on the second conveyor 44. The diverter plate 39 may also includes a plurality of rubber skirts 53 that extend from the bottom end and overlap the second conveyor 44. The diverter plate 39 may further include a pair of angle brackets 55 extending along opposite sides of the buffer flights 45 to interconnect with the skirt walls 124, for example, by bolts. The diverter plate 39 may be removably mounted within the tank 14 so that it can be readily replaced if it becomes worn or damaged. To facilitate replacement, the diverter plate 39 may include a centrally located lift ring 47.

Figure 10:
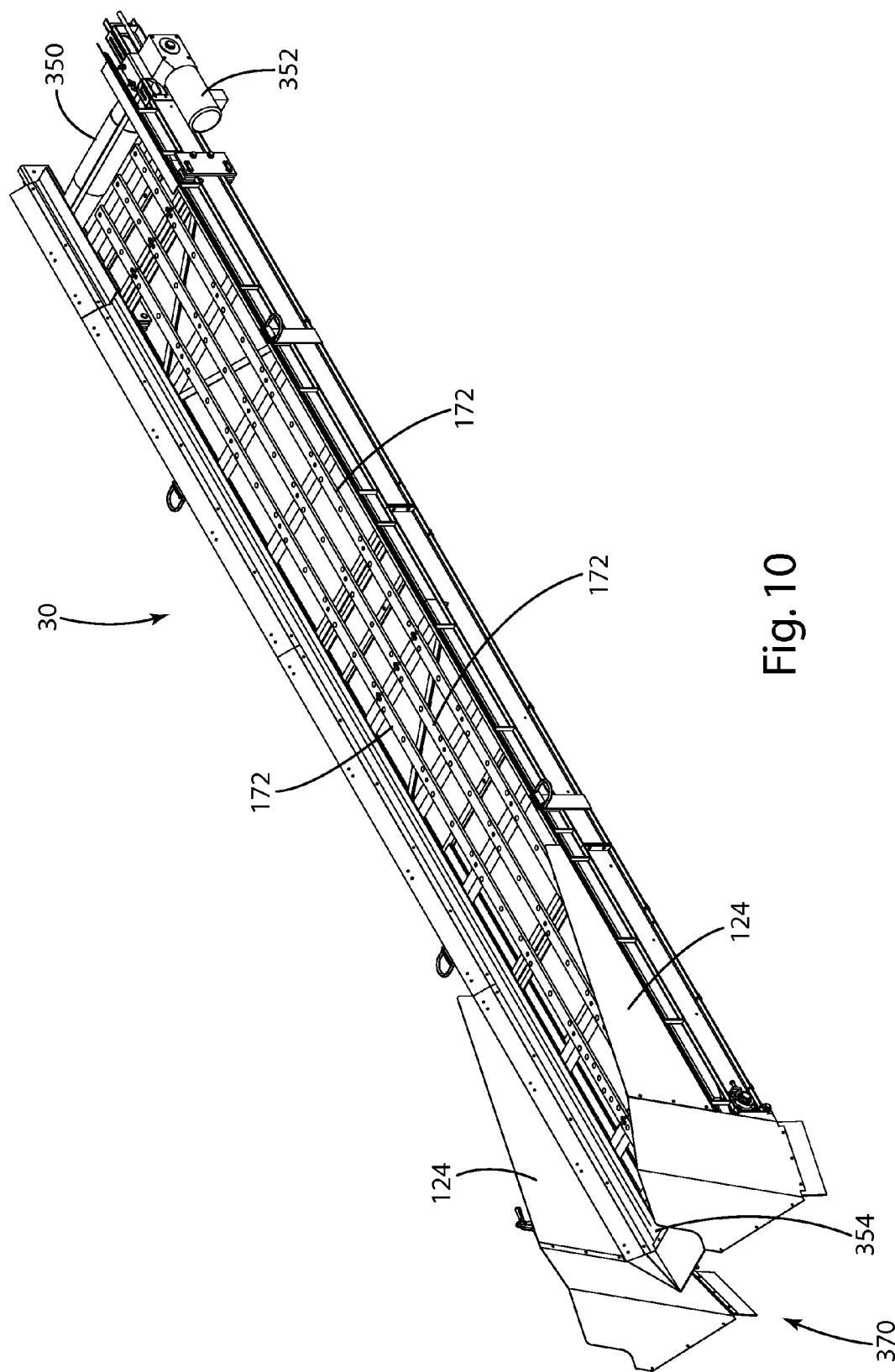
FIG. 10 is a perspective view of the first material conveyor.
Figure 11:
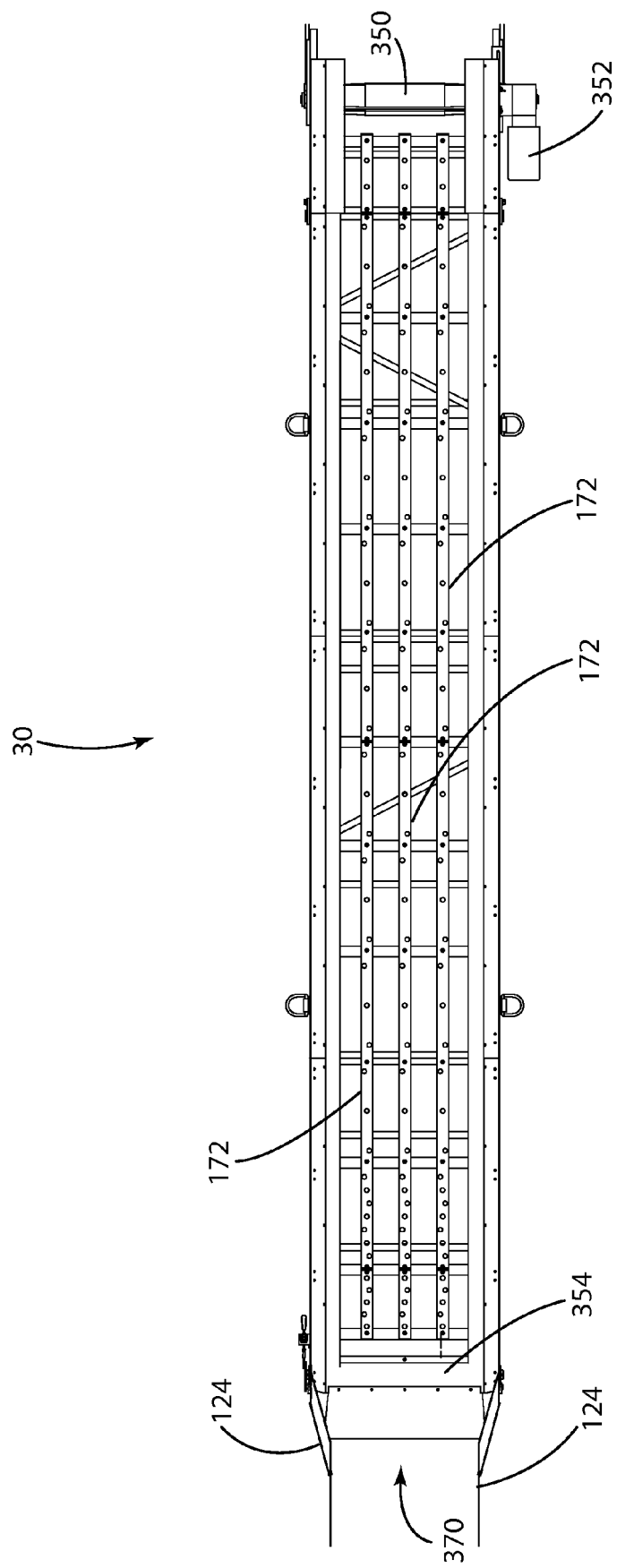
FIG. 11 is a top plan view of the first material conveyor.

In the illustrated embodiment, the first conveyor 30 generally includes a belt 168, a drive roller 350, a variable speed drive motor 352, an idler roller 354 and a plurality of belt supports 172 (See FIGS. 10 and 11). The belt 168 is a mesh belt and may be constructed from polyester mesh manufactured by GKD-USA or any other suitable material. The belt 168 is made of mesh to permit the flocculent 26 to flow through the belt 170 providing enhanced performance. Although the belt 168 is made of mesh in the illustrated embodiment, it may alternatively be manufactured from other perforated materials in some applications. The drive roller 350 and idler roller 354 are generally conventional and therefore will not be described in detail. The drive motor 352 may be a variable speed motor to permit adjustment of the speed of the first conveyor 30. The belt 168 is supported and rides upon an arrangement of conventional longitudinal belt supports 172. The belt supports 172 can be constructed of UHMW polyethylene or any other suitable materials.

Figure 6:
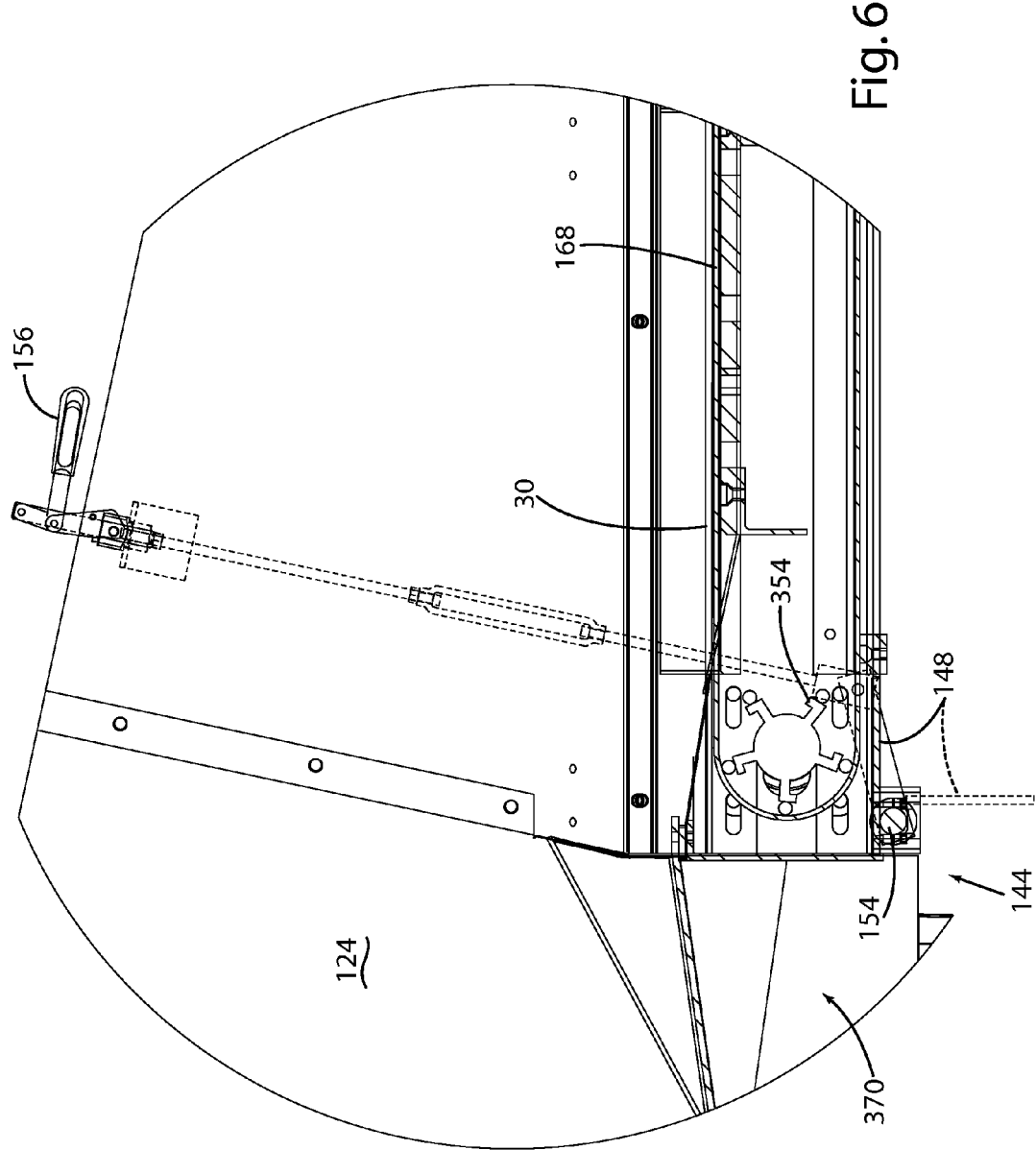
FIG. 6 is an enlarged sectional view of area VI of FIG. 3 with portions removed to show the first material conveyor clean out valve.

To prevent debris from binding up in the idler roller 354, the first conveyor 30 of the illustrated embodiment includes a shroud 370 that shields the idler roller 354 from debris. The shroud 370 includes a pivotal lower panel 144 that can be dropped down to release any material that may accumulate within the shroud 370. FIG. 6 shows the panel 144 in the closed position in solid lines and in the open position in phantom lines. The lower panel 144 is a flat, rectangular piece of material 148 spanning the width of the first conveyor 30. One edge of the lower panel 144 is pivotally mounted to the underside of the shroud 370 beneath the idler roller 354 by axle 154. The opposite edge of the lower panel 144 is operatively connected to a handle 156 by a conventional linkage. When the handle 156 is opened, the lower panel 144 is free to pivot downwardly about axle 154 to release the debris. When the handle is closed, the lower panel 144 is lifted back up into a position enshrouding the idler roller 354. In this embodiment, the lower panel 144 opens toward the far end of the tank 14 so that debris is released in the direction of travel of the second conveyor 44. This reduces the possibility of the second conveyor 44 causing the debris to flow back up into the workings of the first conveyor 142.

Figure 12:
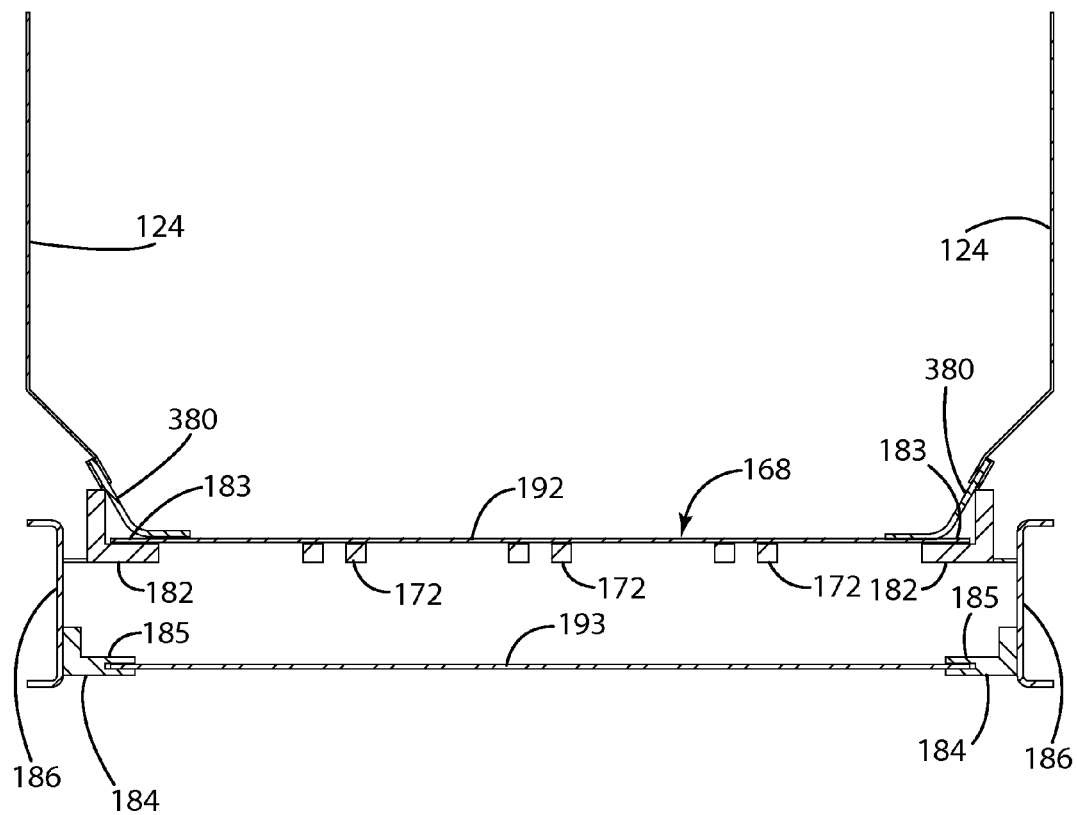
FIG. 12 is a sectional view of the first material conveyor taken along line XII-XII of FIG. 4 showing the belt in the upper and lower channels.

In one embodiment, the first conveyor mesh belt 168 travels up and out of the tank 14 on upper rails 182 and travels down and back into the tank 14 in lower channels 184 (See FIG. 12). The upper rails 182 and lower channels 184 shepherd the belt 168 and prevent debris from flowing around the belt 168 into the inner workings of the conveyor 30, for example, into the idler roller 354. The upper rails 182 extend along on each side 186 of the frame 188 of the conveyor 30 from a point near drive roller 350 to a point near idler roller 354. The upper rails 182 may, however, extend along less of the conveyor 30, as desired. The upper rails 182 are generally L-shaped and each defines a shelf 183 that receives the corresponding edge of the top mesh belt surface 192 as the belt 168 travels up and out of the tank 14. A rubber skirt 380 is mounted above the belt 168. The rubber skirt 380 overlays the longitudinal edges of the belt 168, preferably along the entire length of the first conveyor 30, to prevent debris from flowing around the longitudinal sides of the belt 168. The lower channels 184 extend along on each side 186 of the frame 188 of the conveyor 30 through approximately the lower one third of the first conveyor 30. They may, however, extend along more or less of the conveyor 30, as desired. The lower channels 184 each define a generally U-shaped slot 185 that receives the corresponding edge of the bottom mesh belt surface 193 as the belt 168 travels down back into the tank 14. The upper rails 182 and lower channels 184 may be manufactured from UHMW polyethylene or other suitable materials. UHMW polyethylene is desirable in some applications because it is wear resistant and provides a relatively low friction surface against which the belt 168 can ride.

Figure 14:
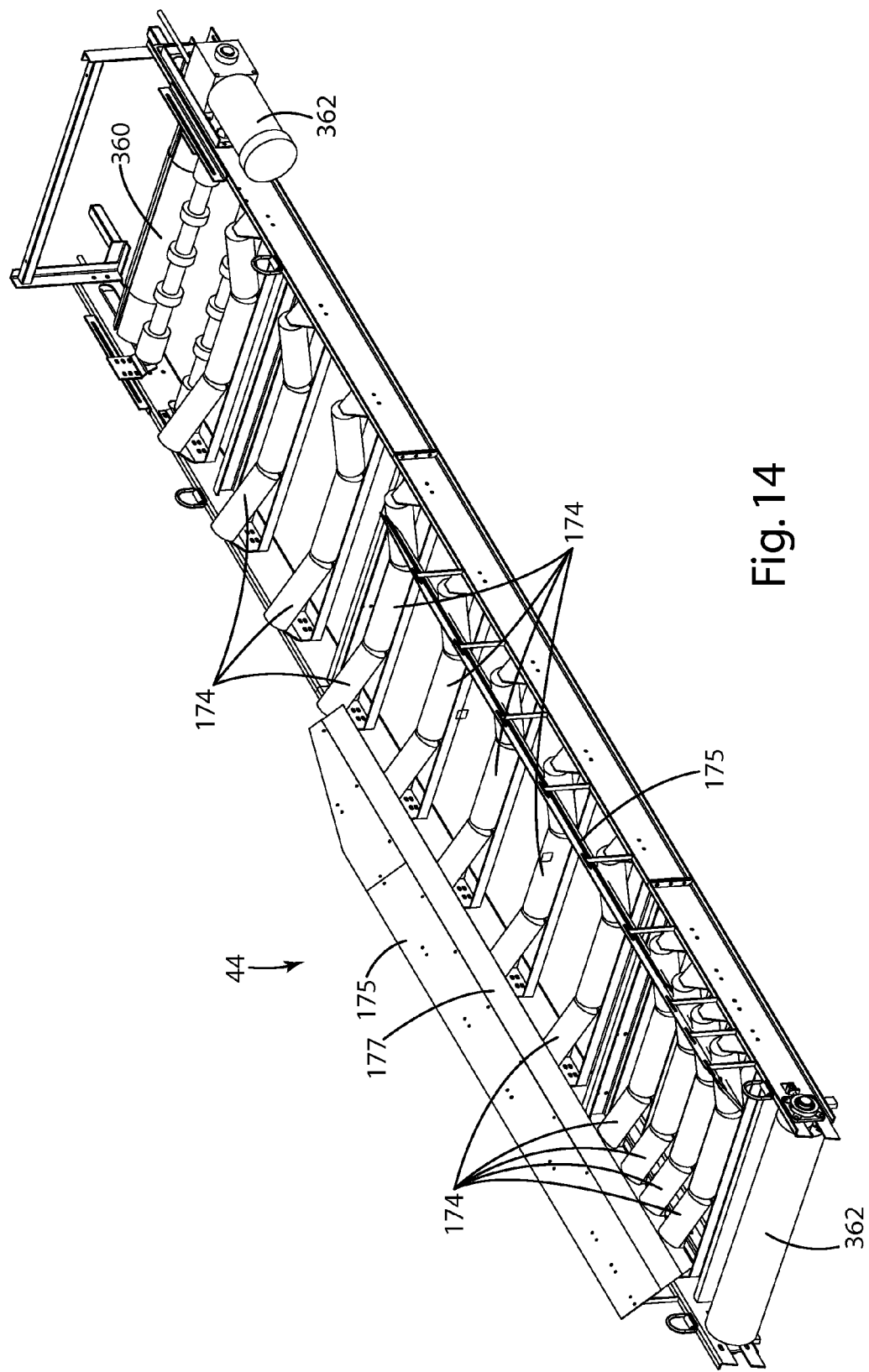
FIG. 14 is a perspective view of the second material conveyor.

In the illustrated embodiment, the second conveyor 44 is somewhat similar to the first conveyor 30 and generally includes a belt 162, a drive roller 360, a variable speed drive motor 362, an idler roller 362 and a plurality of belt support rollers 174 (See FIG. 14). As with belt 168, the belt 162 of the second conveyor 44 may be manufactured from mesh or another perforated material. The drive roller 360 and idler roller 362 are generally conventional and therefore will not be described in detail. The drive motor 362 may be a variable speed motor to permit adjustment of the speed of the second conveyor 44. The belt 168 is supported and rides upon an arrangement of conventional rollers 174. The rollers 174 are better able to withstand the impact and support the weight of material B than the belt supports 172 described above in connection with the first conveyor 30. The rollers 174 are arranged so that the second conveyor 44 is concave. The concavity of the second conveyor 44 assists in retaining material B on the second conveyor 44 as it is conveyed out of the flotation tank 14. The first several rollers 174 supporting the second conveyor belt 162 may be impact rollers 176 that are able to withstand the impact of dense material B as it drops from the feed assembly conveyor 50 through the flocculent 26. The subsequent rollers 178 on the second conveyor 44 may be standard metal rollers 178. All of the conveyors 18 may be constructed in any way that provides the required performance of the separation system 10 including, but not limited to, steel rollers, impact rollers, frame supports, mesh belts, rubber belts, and flights. The second conveyor 44 may also include skirting extending along a portion of the conveyor 44. The skirting may include rigid upper skirting 175 and flexible lower skirting 177. The rigid upper skirting 175 may be manufactured from sheet metal and may be mounted to opposite sides of the conveyor 44. The flexible lower skirting 177 may be manufactured from rubber and may be mounted to the lower end of the rigid skirting 175. The flexible lower skirting 177 may be configured to overlap opposite longitudinal edges of the belt 162.

Figure 8:
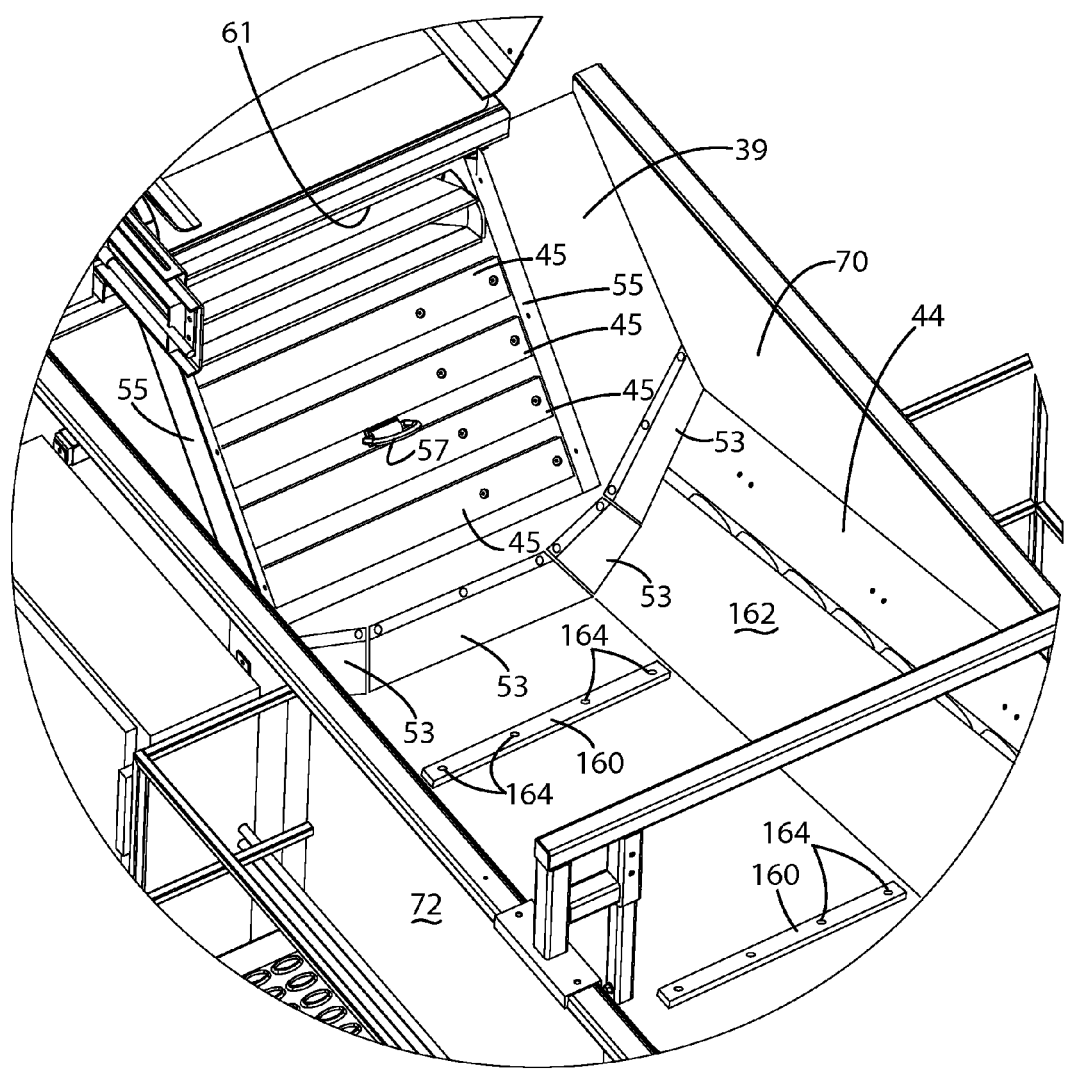
FIG. 8 is an enlarged perspective view of area VIII of FIG. 3 with the first conveyor removed.

To aid in bringing material B up and out of the flotation tank 14, flights 160 may be added on the second conveyor belt 162 (See FIG. 8). These flights 160 provide traction for the material B to be moved up by the second conveyor 162 without rolling back down again. The flights 160 may be spaced apart any appropriate distance on the second conveyor belt 162 and may be attached to the second conveyor belt 162 using any suitable mechanism. However, consideration should be given to the potential degradation to the life of the belt that may be caused by the selected attachment mechanism. One suitable method for attaching the flights 160 to the belt 162 is to sandwich the belt 162 between the flight 160 and a corresponding cleat (not shown). The flight 160 and cleat are interconnected by a plurality of fasteners, such as bolts 164, that extend through the belt 162. The flight 160 and cleat cooperatively distribute the attendant forces across the belt 162 over the width of the flight 160 to reduce the likelihood of damage to the belt 162. The area of the belt 162 where the cleat is attached to the flight 160 may be fortified with epoxy or another suitable material. The epoxy reinforces the belt 162 in the attachment region reducing the likelihood of fraying or other damage to the belt 162. For example, the epoxy entraps and holds any belt strands 166 that may have been sheared or otherwise damaged when the cleat 164 was attached.

Figure 15:
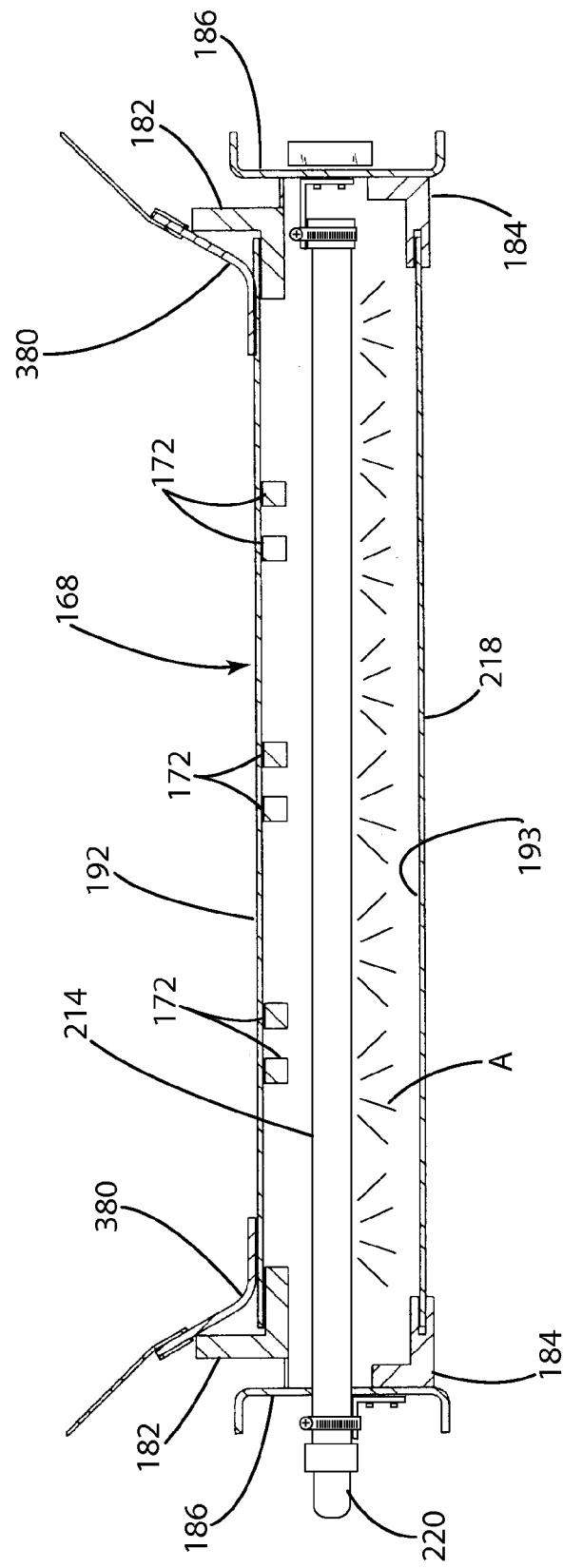
FIG. 15 is a sectional view of the first material conveyor taken along line XV-XV of FIG. 2 showing the air knife assembly disposed between the upper and lower runs of the belt.

In one embodiment, the conveyors 18 are equipped with air knives 202 for cleaning purposes (See FIGS. 2 and 15). Debris can become lodged in the holes of the mesh belts 162, 168 during standard operation of the separation system 10. The air knife 202 projects a blast of air through the mesh belts 162, 168 to dislodge any debris stuck in the belts. The air knife system 202 generally includes a blower 206, a pair of air tubes 214 and a network of the air supply lines 220. The blower 206 is attached to the outside of a side wall 210 of the flotation tank 14. A separate air tube 214 is mounted adjacent to each mesh belt 162, 168. In the illustrated embodiment, the air tubes 214 are located between the upper and lower surfaces of the corresponding belt 162, 168 (See FIG. 15). Each air tube 214 defines a series of small holes (not shown) which are capable of releasing pressurized air A onto the belts 162, 168. For example, each air tube 214 may define a plurality of staggered slots (not shown) that cooperatively direct pressurized air A across the full surface of the corresponding belt 162, 168. Each air tubes 214 is positioned adjacent to the bottom surface 218 of the corresponding mesh belt 162, 168 with the holes pointing downward through the bottom surface 218 of the mesh belt 162, 168. Air lines 220 run from the blower 206 to the air tubes 214. Valves 217 may be positioned along the air lines 220 to control the amount of air supplied to each air tube 214. In operation, the blower 206 supplies pressurized air A to the air tubes 214 via the air lines 220. The pressurized air A is expelled from the air tubes 214 through the arrangement of holes. The pressurized air causes debris stuck in the mesh belts 162, 168 to be blasted free from the belts and fall downward and away from the separation system 10. In one embodiment, a guide (not shown) may be attached to the conveyor 18 to direct the debris to the desired location.

In one embodiment, a spray bar (not shown) for spraying down sorted materials with flocculent 26 may be installed on the first 30 and second 44 conveyors.

VI. Cleaning Mechanisms

One embodiment includes several mechanisms 20 that aid in maintaining the system 10 free of debris and extending the component life of the separation system 10. These mechanisms 20 include a drag line assembly 76 in the lower chamber 88 of the flotation tank 14 (See FIG. 16), a cleanout valve 82 separating the upper 42 and lower 88 chambers of the flotation tank 14 (See FIGS. 13a and 13b), a water tight hatch (not shown) for manual cleaning and repair, and a drain valve 230 for draining the flotation tank 14 (See FIG. 1), as well as, the previously described shroud lower floor 144 (See FIG. 6) and air knives 202 (See FIG. 2).

Figure 16:
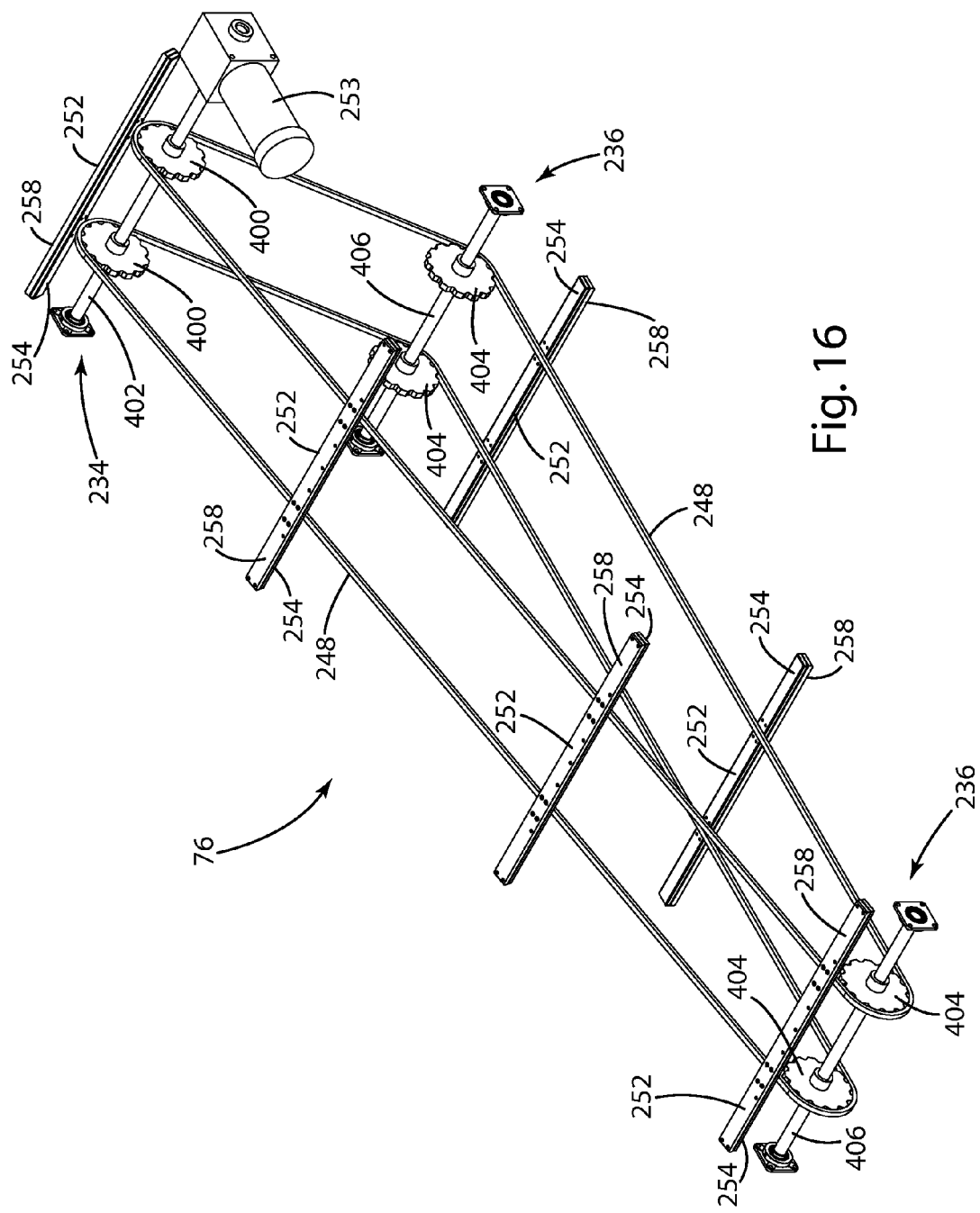
FIG. 16 is a perspective view of the drag line assembly with portions removed.

The drag line assembly 76 is located in the lower chamber 88 of the flotation tank 14 to dredge the floor of the lower chamber 88. The drag line assembly 76 collects and disposes of debris accumulated in the lower chamber 88 to prevent the debris from being re-circulated through the impeller assembly 94 causing wear or damage to the impeller assembly 94 or material conveyors 18. As perhaps best shown in FIG. 16, the drag line assembly 76 generally includes a plurality of wipers 252 that are carried on a pair of chains 248. For ease of illustration, the chains 248 are shown in FIG. 16 as solid strips, but it should be recognized that the chains 248 are generally conventional chains. The chains 248 and wipers 252 are driven around a drive assembly 234 and two idler assemblies 236 by a motor 253. The drive assembly 234 is located in the uppermost portion of the far end 238 of the lower chamber 88 of the flotation tank 14 and generally includes a pair of chain drive gears 400 mounted toward opposite ends of an axle 402. The axle 402 is operatively connected to the motor 253 so that operation of the motor causes rotation of the axle 402 and consequently the chain drive gears 400. The first idler assembly 240 is located at the bottom 242 of the far end 246 of the flotation tank 14, and the second idler assembly 244 is located at the bottom 242 of the near end 244 of the flotation tank 14. The two idler assemblies 240 and 244 generally include a pair of gears 404 mounted toward opposite ends of an axle 406. The axles 406 are rotatably mounted within the tank 14, for example, to the tank walls. The two chains 248 are operatively engaged with drive assembly 234 and the idler assemblies 236. The wipers 252 are attached between these chains 248 at the desired interval. The wipers 252 consist of a flat metal base 254 connected to the chains 248 at each of the base ends 254 with a blade 258 of UHMW polyethylene or other appropriate material connected to the base 254. The bottom of the flotation tank 242 is dredged by the blade 258 to prevent wear on the metal base 254. However, the wiper base 254 may be constructed of any materials and in any way that provides acceptable functionality.

Figure 13A:
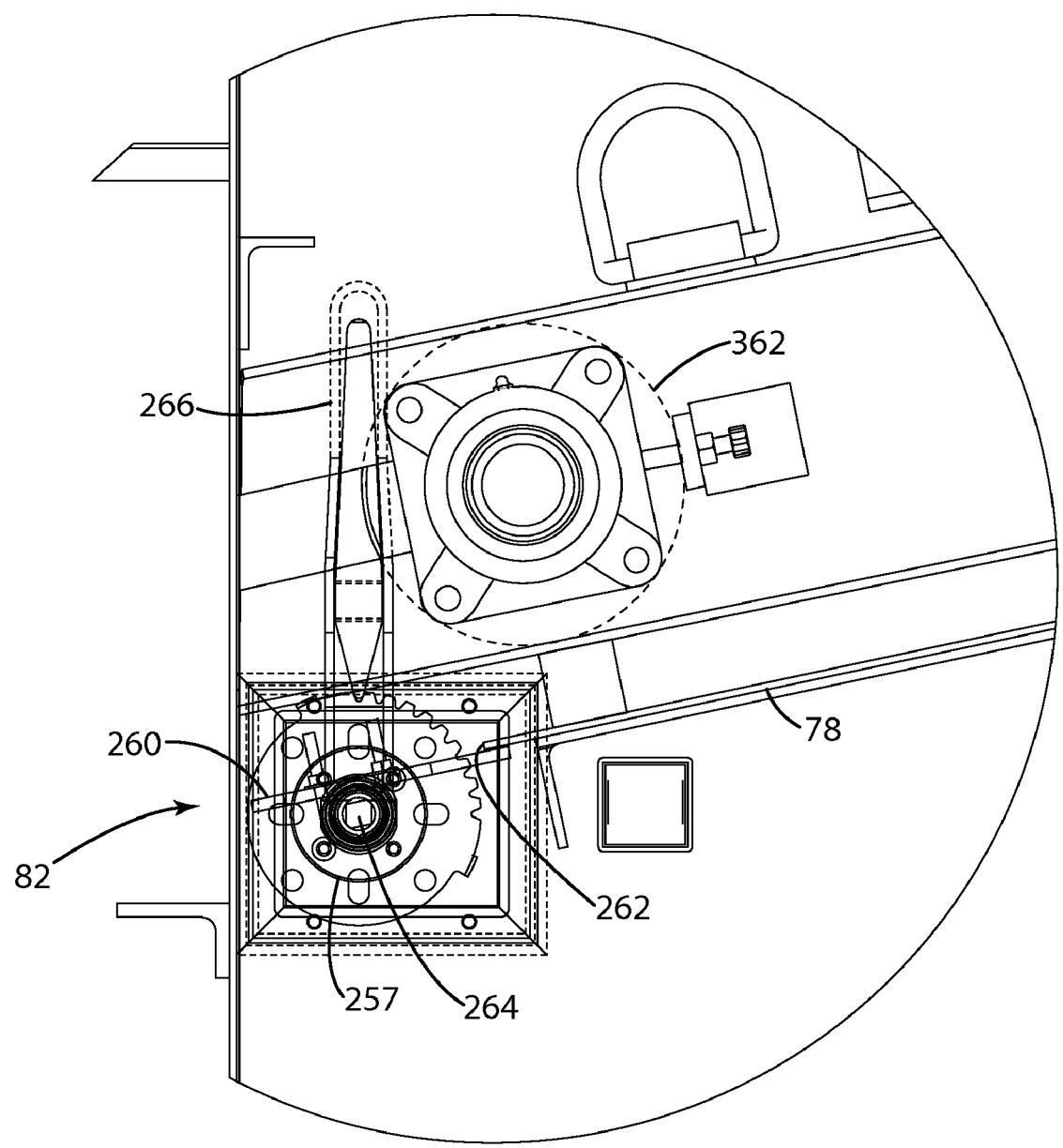
FIG. 13a is an enlarged view of a portion of the material separator showing the upper tank clean out valve.
Figure 13B:
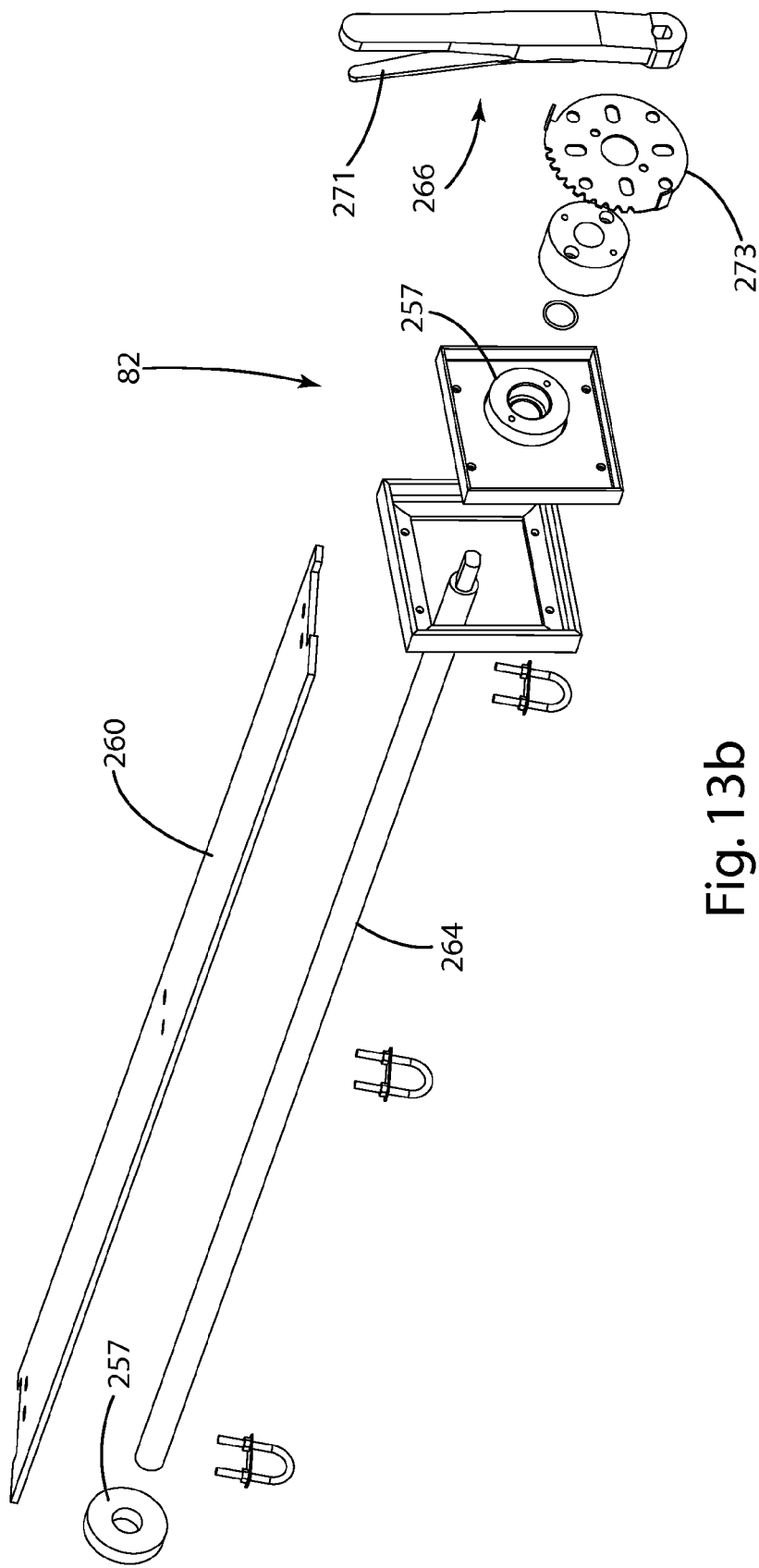
FIG. 13b is an exploded perspective view of the upper tank clean out valve assembly.

As perhaps best shown in FIGS. 13a and 13b, the cleanout valve 82 is located on the partition 78 at the near end 64 of the flotation tank 14. The cleanout valve 82 is opened to allow small debris that has collected at the bottom 252 of the upper chamber 42 of the flotation tank 14 to be released into the lower chamber 88 where the drag line 76 can remove the debris from the flotation tank 14. The cleanout valve 82 generally includes a rectangular shaped piece 260 that overlaps a gap 262 between the partition 78 and the near end wall 62 of the flotation tank 14. The rectangular piece 260 is attached to a rod 264 with a handle 266. The rod 264 may be supported within the tank 14 upon bearings 257. The handle 266 may be of essentially any type. However, in the illustrated embodiment, the handle 256 is a conventional locking handle having a spring handle 271 and a locking plate 273 that permits the valve 82 to be locked in the desired position. When the handle 266 is turned, the rod 264 to turns causing the rectangular piece 260 to pivot open, making an opening 268 between the upper 42 and lower 88 chambers of the flotation tank 14. Debris that has collected on top 270 of the rectangular piece of the cleanout valve 260 in the upper chamber 42 then falls to the lower chamber 88 of the flotation tank 14 where the debris is disposed of by the drag line 76. The cleanout valve 82 limits the wear on the second conveyor 44 caused by debris settling into its mechanisms 272. The cleanout valve 82 also limits the amount of manual cleaning required of the separation system 10 by moving debris to a location where the drag line 76 can to dispose of it.

A water tight hatch (not shown) is located in end wall or side wall of the flotation tank 14 in the lower chamber 88 of the tank 14. The hatch provides accessibility to the lower chamber 88 should the need ever arise for manual cleaning or to service any components of the separation system 10. A drain valve 230 is also located in the lower chamber 88 of the flotation tank 14 to completely drain the system 10 when necessary for service or cleaning or when moving the material separator 10.

VII. Wheel and Frame Assembly

Figure 17:
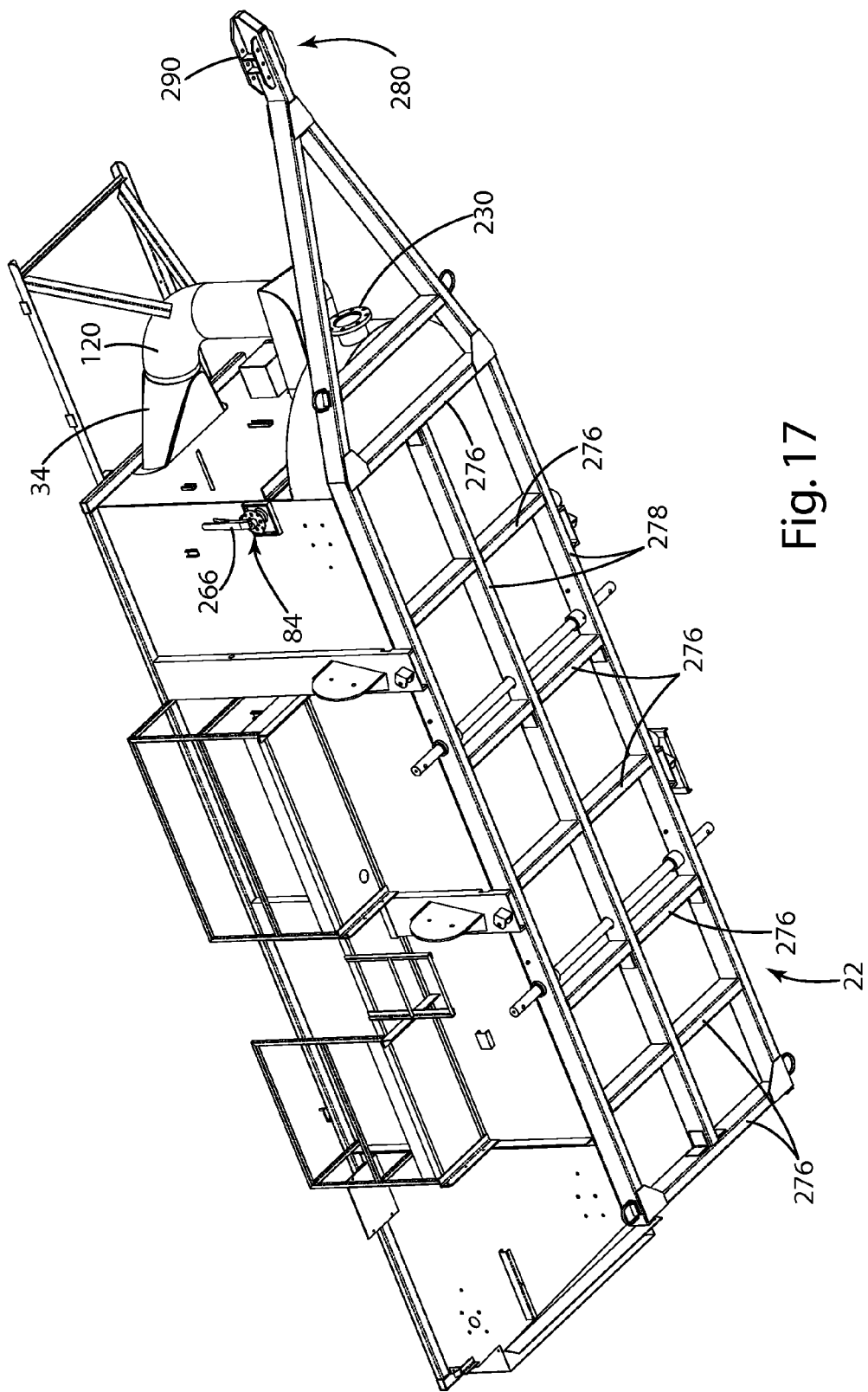
FIG. 17 is a bottom perspective view of the material separator with portions removed to show the wheel and frame assembly.

In one embodiment, the flotation tank 14 is supported by a steel frame 22 made up of transverse and longitudinal cross members 274, 276 (See FIG. 17). In the depicted embodiment, seven frame members transverse 276 beneath the tank 14 and three longitudinal frame members 278 span the length of the tank 14. However, the material separator 10 may include any support structure that provides an adequate foundation for the flotation tank 14.

In one embodiment, a towing hitch 280 and wheels 294 may be added to the flotation tank 14 to increase portability of the separation system 10 (See FIG. 1). The hitch 280 in the depicted design is located on the near end 64 of the flotation tank 14 connected to the frame support members 22 on the underside of the flotation tank 14. The hitch 280 is connected at the bottom near corners of the flotation tank 14 and comes together at a point some distance in front of the near end 64 of the flotation tank 14. At the point where the hitch members come together 288 means 290 to connect the hitch 280 to a trailoring vehicle is attached.

Figure 3:
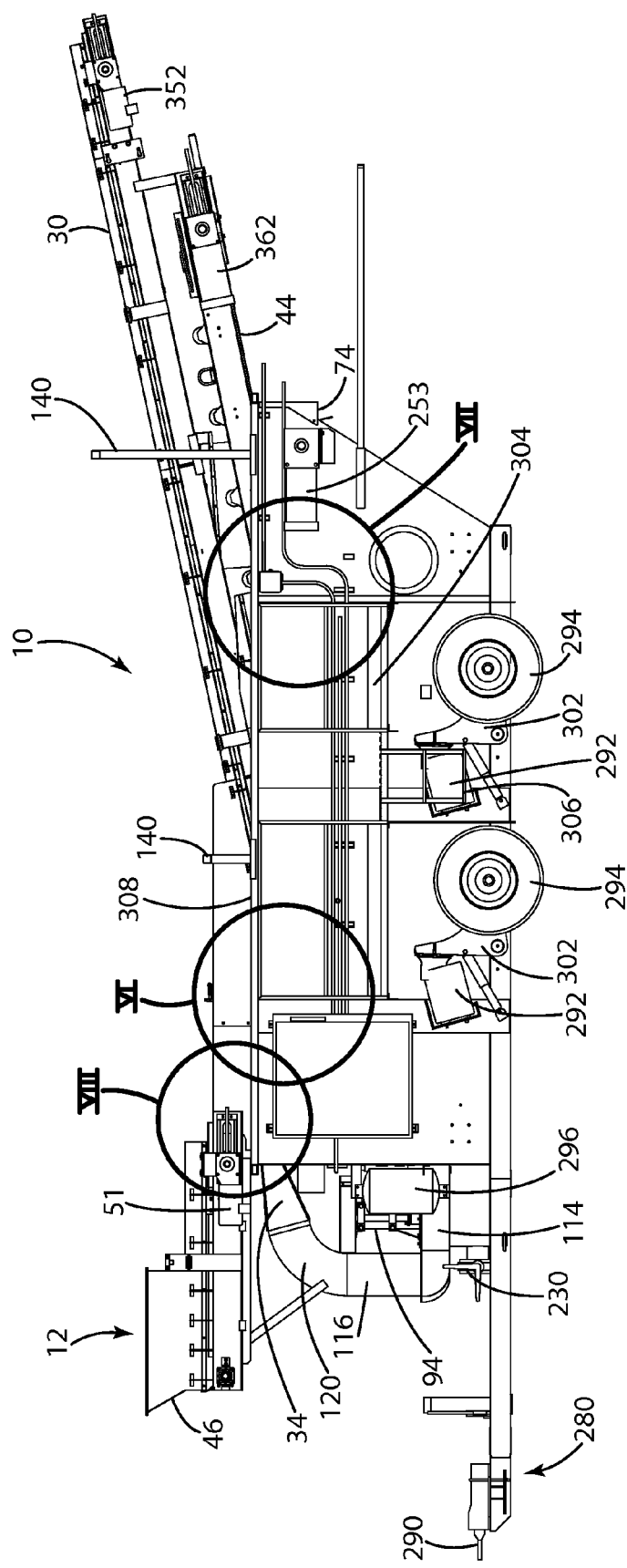
FIG. 3 is a left side elevational view of the material separator.

Four wheel assemblies 282 are placed on the tank 14 in the depicted embodiment (See FIGS. 2 and 3). The wheel assemblies 282 have the capability to be raised or lowered through use of heavy duty air bags 292 (See FIGS. 3 and 18). This allows the wheels 294 to be raised so that the tank 14 rests directly on the ground when filled with flocculent 26; this adds stability to the separation system 10 and minimizes stress on the wheels 294. When the wheels 294 are lowered, the pressurized air bags 292 provide cushioning to the separation system during transport. Air pressure is provided for the air bags 292 by an air tank 296 mounted on the flotation tank 14. In one embodiment, the air tank 296 pressurizes a portion of the tubular frame 276, 278 that is adjacent to the air bags 292. The airbags 292 are then connected to the pressurized frame segment 276, 278 using air hoses (not shown) or some other connection means. In this way, the tubular frame 276, 278 functions as the air lines for supplying pressurized air to the air bags 292. Alternatively, conventional air hoses (not shown) or some other connection means may be run directly from the air tank 296 to the air bags 292. The airbags 292 are connected to a pivot bracket 302 which is connected to the wheel assembly 282. When the airbags 292 are inflated, the pivot bracket 302 is rotated downward causing the wheels 294 to be lowered. When air pressure is released from the airbags 292, the pivot bracket 302 rotates in the opposite direction and the wheels 294 are moved upward. Movement of the wheels 294 can be seen by comparing FIG. 3 (lowered for travel) with FIG. 18 (raised for operation).

Figure 18:
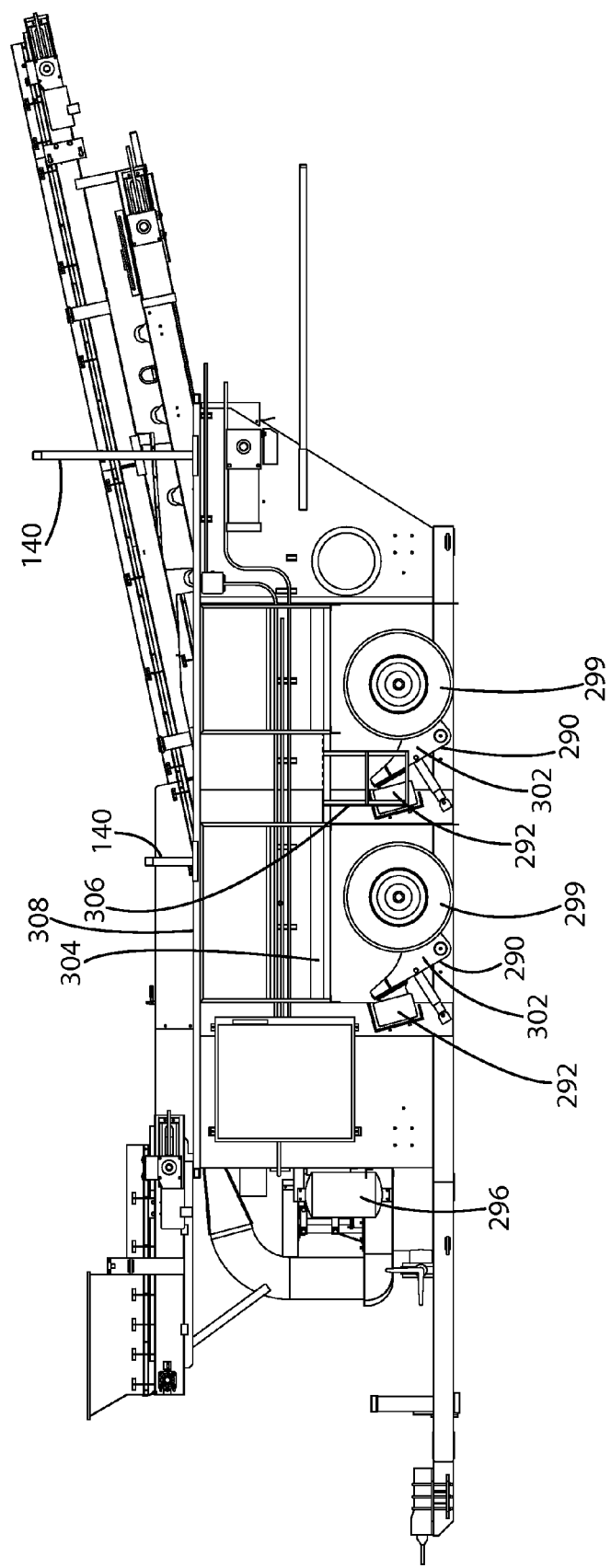
FIG. 18 is a side elevational view of the material separator showing the wheels in the raised position.

To facilitate maintenance and operation of the separation system 10, catwalk platforms 304 may be placed over the wheel assemblies 282 on both sides 210 of the flotation tank 14 in one embodiment (See FIGS. 1 and 18). A ladder 306 hangs from the catwalk platform 304 for entrance to the platform 304, and a guardrail 308 is located around the platform 304 for safety of those on the platform. The catwalk platforms 304 allow operators to view the separation device 10 while the separation device 10 is running and to make any necessary adjustments for optimal performance of the system 10.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. An apparatus for separating materials comprising:
   a tank containing a flocculent, said tank having an upper chamber and lower chamber, said upper chamber being in fluid communication with said lower chamber, whereby flocculent may flow from said upper chamber to said lower chamber;
   a first material conveyor disposed in said upper chamber, said first material conveyor having at least an end disposed in said flocculent, said conveyor being operable to convey materials from said tank, said first material conveyor includes a perforated belt;
   a second material conveyor, said second material conveyor having at least an end disposed in said flocculent, said second material conveyor being operable to convey materials from said tank; and
   a flocculent circulation system interconnecting said upper chamber and said lower chamber, said flocculent circulation system being operable to move flocculent from said lower chamber to said upper chamber;
   further including a valve interposed between said upper chamber and said lower chamber, said valve being operable to vary a rate of flow of flocculent from said upper chamber to said lower chamber; said tank includes a divider wall extending between said upper chamber and said lower chamber, and wherein said valve is disposed within said divider wall, and
   further including a clean out valve disposed within said divider wall.

2. The apparatus of claim 1 wherein said divider wall is inclined having an upper end and a lower end, said clean out valve being disposed toward said lower end.

3. An apparatus for separating materials comprising:
   a tank;
   a flocculent contained within said tank;
   a flocculent circulation system for circulating said flocculent within the tank; and
   a conveyor for removing materials from said tank, said conveyor having at least a lower end disposed within said flocculent, said conveyor having a perforated belt, whereby said flocculent is capable of passing through said belt;
   further comprising a second material conveyor having at least a lower end disposed within said flocculent, said second material conveyor having a perforated belt, said first material conveyor disposed vertically above said second material conveyor, said first material conveyor extends substantially parallel to said second material conveyor;
   wherein said tank includes an upper chamber and a lower chamber, said first material conveyor and said second material conveyor each having at least a lower end disposed in said flocculent within said upper chamber, said tank includes a partition dividing said upper chamber from said lower chamber, said partition defining an opening placing said upper chamber and said lower chamber in fluid communication; and
   further including a valve disposed in said opening.

* * * * *